(12) United States Patent
Chao et al.

(10) Patent No.: US 11,143,873 B1
(45) Date of Patent: *Oct. 12, 2021

(54) INTEGRATED OPTICAL CHIP FOR GENERATING PATTERNED ILLUMINATION

(71) Applicant: Facebook Technologies, LLC, Menlo Park, CA (US)

(72) Inventors: Qing Chao, Redmond, WA (US); Zhaoming Zhu, Redmond, WA (US); Michael Hall, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/735,284

(22) Filed: Jan. 6, 2020

Related U.S. Application Data

(63) Continuation of application No. 16/028,197, filed on Jul. 5, 2018, now Pat. No. 10,564,431.

(51) Int. Cl.
  *G02B 27/14* (2006.01)
  *G02B 27/01* (2006.01)
  *G02B 27/00* (2006.01)

(52) U.S. Cl.
  CPC ..... *G02B 27/0172* (2013.01); *G02B 27/0093* (2013.01); *G02B 27/0101* (2013.01); *G02B 27/0176* (2013.01); *G02B 2027/014* (2013.01); *G02B 2027/0127* (2013.01); *G02B 2027/0138* (2013.01); *G02B 2027/0141* (2013.01); *G02B 2027/0178* (2013.01)

(58) Field of Classification Search
  CPC ........... G02B 27/0172; G02B 27/0176; G02B 27/0101; G02B 27/0093; G02B 2027/0127; G02B 2027/0178; G02B 2027/0138; G02B 2027/014; G02B 2027/0141
  See application file for complete search history.

(56) References Cited

U.S. PATENT DOCUMENTS

| | | | |
|---|---|---|---|
| 4,798,437 A | 1/1989 | Rediker et al. | |
| 10,564,431 B1 * | 2/2020 | Chao | G02B 27/0176 |
| 2010/0290060 A1 * | 11/2010 | Mohazzab | G01B 11/25 356/492 |

* cited by examiner

*Primary Examiner* — Joseph P Martinez
(74) *Attorney, Agent, or Firm* — Fenwick & West LLP

(57) ABSTRACT

A compact light projection system is described for use in artificial reality systems, and which outputs patterned interferometric illumination that may be dynamically adjustable. The light projection systems are Integrated Circuits (IC)s, which are compact and easily added to other electronic devices in an artificial reality device. The IC illumination sources described herein provide flexibility by incorporating dynamically adjustable components as well as static components, such as phase delay devices, coupling controllers, switch-able light sources, and output gratings, which may each be adjusted to control the resulting pattern of interferometric illumination.

17 Claims, 9 Drawing Sheets

INTEGRATED OPTICAL CHIP FOR GENERATING PATTERNED ILLUMINATION

CROSS REFERENCE TO RELATED APPLICATIONS

This application is a continuation of co-pending U.S. application Ser. No. 16/028,197, filed Jul. 5, 2018, which is incorporated by reference in its entirety.

BACKGROUND

The present disclosure generally relates to illumination sources that generate patterned light, and specifically relates to patterned light illumination for depth sensing in artificial reality applications.

Virtual reality (VR) systems, augmented reality (AR), and mixed reality (MR) systems can leverage the capture of the environment surrounding a user in three dimensions (3D), as well as tracking the direction of a user's gaze and other information about a user's eyes. High density illumination pattern generation is an important aspect of any depth camera sensing, since high density of light incident on objects and/or a user's eye provides finer grain depth information. However, traditional illumination devices for both eye tracking and local area sensing are comparably large in size, heavy, and consume significant amounts of power. Additionally, prior art illumination devices use diffractive optical elements to diffract multiple laser beams, or active acousto-optic devices or liquid crystal devices are coupled to a light source to generate patterned illuminations. Prior art illumination devices may not be sufficiently compact or dynamically adjustable.

SUMMARY

A compact light projection system is described for use in artificial reality systems, and which outputs patterned interferometric illumination that may be dynamically adjustable. The light projection systems are Integrated Circuits (IC)s, which are compact and easily added to other electronic devices in an artificial reality device. The IC illumination sources described herein provide flexibility by incorporating dynamically adjustable components, such as phase delay devices, coupling controllers, switch-able light sources, and output gratings, which may each be adjusted to control the resulting pattern of interferometric illumination.

An illumination source includes a first light source located on a first substrate. A first waveguide located on the first substrate is optically coupled to the first light source. A second waveguide is configured to receive the light from the waveguide. A first active phase delay element is configured to apply a first phase delay to light propagating in the third waveguide such that there is a difference in phase between light exiting the second waveguide and light exiting the third waveguide. The light exiting the second waveguide and the light exiting the third waveguide combine to form a first structured light pattern that illuminates a portion of a target area, and the first structured light pattern is based in part on the first phase delay. The illumination source is part of a depth camera assembly (DCA) that is configured to capture images of a portion of the target area that includes at least some of the first structured light pattern, and the DCA is further configured to determine depth information for an object in the target area based in part on the captured images.

DETAILED DESCRIPTION

The illumination devices described herein are chip-scale integrated optical devices that create patterned light through interferometric output waveguides and active phase delays. One or more light generators are coupled to waveguides that split the input light into two spatially coherent light beams. An active phase delay is applied to one or more of the light beams. The output light from the two waveguides results in an interferometric pattern, which is determined by the applied phase delay and a spatial distance between exit points of the two waveguides. A single chip can be designed such that multiple light sources and multiple waveguide paths and phase delays result in several interferometric patterns output from a single integrated chip (IC). The IC illumination generator is part of a DCA and can be used in the context of a NED system to determine depth information in a target area. For example, in embodiments that have a DCA directed towards in a user's eye, the IC illumination source may help determine information about the user's eye, whereas in embodiments that have the DCA directed towards a local environment, the IC illumination source may help determine information about objects in the local environment.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewer.

Figure 1:
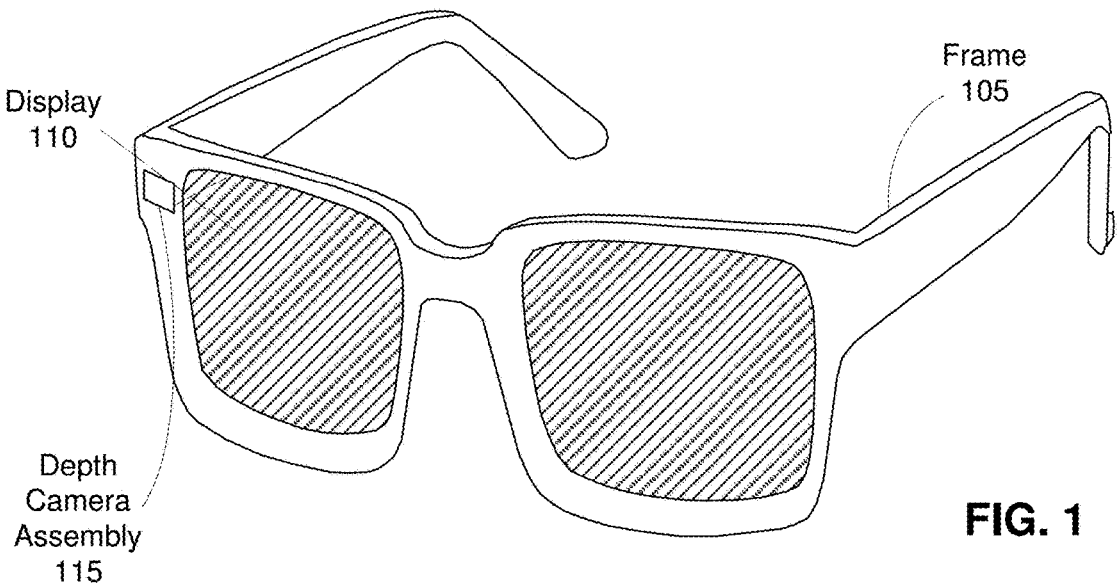
FIG. 1 is a diagram of a near-eye-display (NED), in accordance with an embodiment.

FIG. 1 is a diagram of a near-eye-display (NED) 100, in accordance with an embodiment. In some embodiments, the NED 100 may be referred to as a head-mounted display (HMD). The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED.

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. The display 110 includes at least one display assembly (not shown) for directing one or more image light to an eye of the user.

The NED 100 additionally includes a DCA 115, as described in further detail with reference to FIG. 2. The DCA 115 determines depth information about a target area. The NED 100 may include one or more apertures (not shown) by with the DCA may emit light and/or captures images of a target area. As shown in FIG. 1, the DCA 115 is located on the frame 105. In some examples, the DCA 115 is located at a periphery of the display 110. In some examples, the DCA 115 is located at a corner of the display 110. As described herein, a DCA 115, and specifically an illumination source of a DCA 115 may be used to determine depth information about a user's environment (i.e. light is projected outward from the display 110) or to determine depth information about a user's eyes and/or face (i.e. light is projected backward from the display 110 in the direction of an eye box, such as the eye box 270. In some examples, a single illumination source may be projected both towards an eye box and outwards from the display 110. In some examples, separate illumination sources, such as any of the patterned light generators described herein, may be located on the NED 100 and may be projected in different directions. As referred to herein, a DCA 115 may be any number of separate elements used for depth sensing. For example, a DCA may include a depth camera located separately from an illumination source.

Figure 2A:
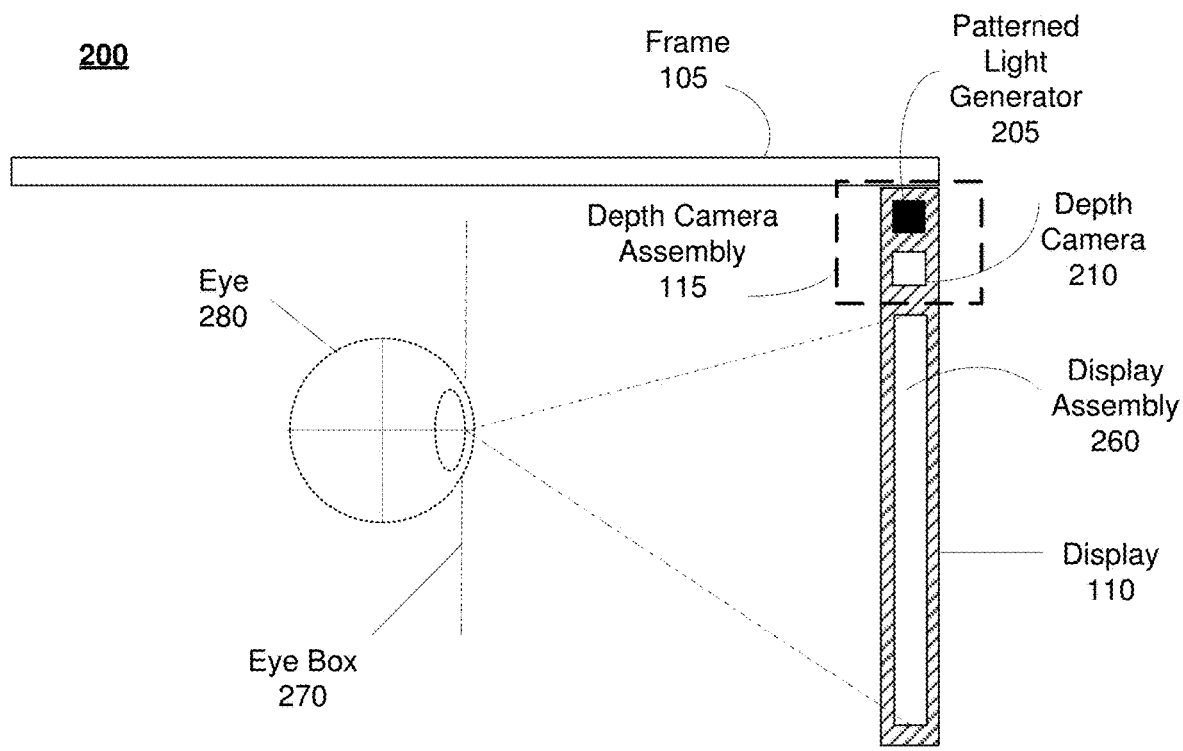
FIG. 2A is a cross-section of an NED, in accordance with an embodiment.

FIG. 2A is a cross-section 200 of the NED 100 illustrated in FIG. 1, in accordance with an embodiment. FIG. 2 is a cross-section 200 of the NED 100 illustrated in FIG. 1, in accordance with an embodiment. The display 110 includes at least one display assembly 260. An eye box 270 is a location where an eye 280 is positioned when the user wears the NED 100. For purposes of illustration, FIG. 2 shows the cross section 200 associated with a single eye 280 and a single display assembly 260, but in alternative embodiments not shown, another display assembly which is separate from the display assembly 260 shown in FIG. 2, provides image light to an eye box located at an exit pupil of another eye of the user.

The display assembly 260, as illustrated below in FIG. 2, is configured to direct the image light to the eye box 270 of the eye 280. The display assembly 260 may be composed of one or more materials (e.g., plastic, glass, etc.) with one or more refractive indices that effectively minimize the weight and widen a field of view (hereinafter abbreviated as 'FOV') of the NED 100. The light from the eye tracking system may be from any of the IC illumination sources described in further detail with reference to FIGS. 3-8.

In some configurations, the NED 100 includes one or more optical elements between the display assembly 260 and the eye 280. The optical elements may act to, e.g., correct aberrations in image light emitted from the display assembly 260, magnify image light emitted from the display assembly 260, some other optical adjustment of image light emitted from the display assembly 260, or some combination thereof. The example for optical elements may include an aperture, a Fresnel lens, a convex lens, a concave lens, a filter, or any other suitable optical element that affects image light.

Figure 2B:
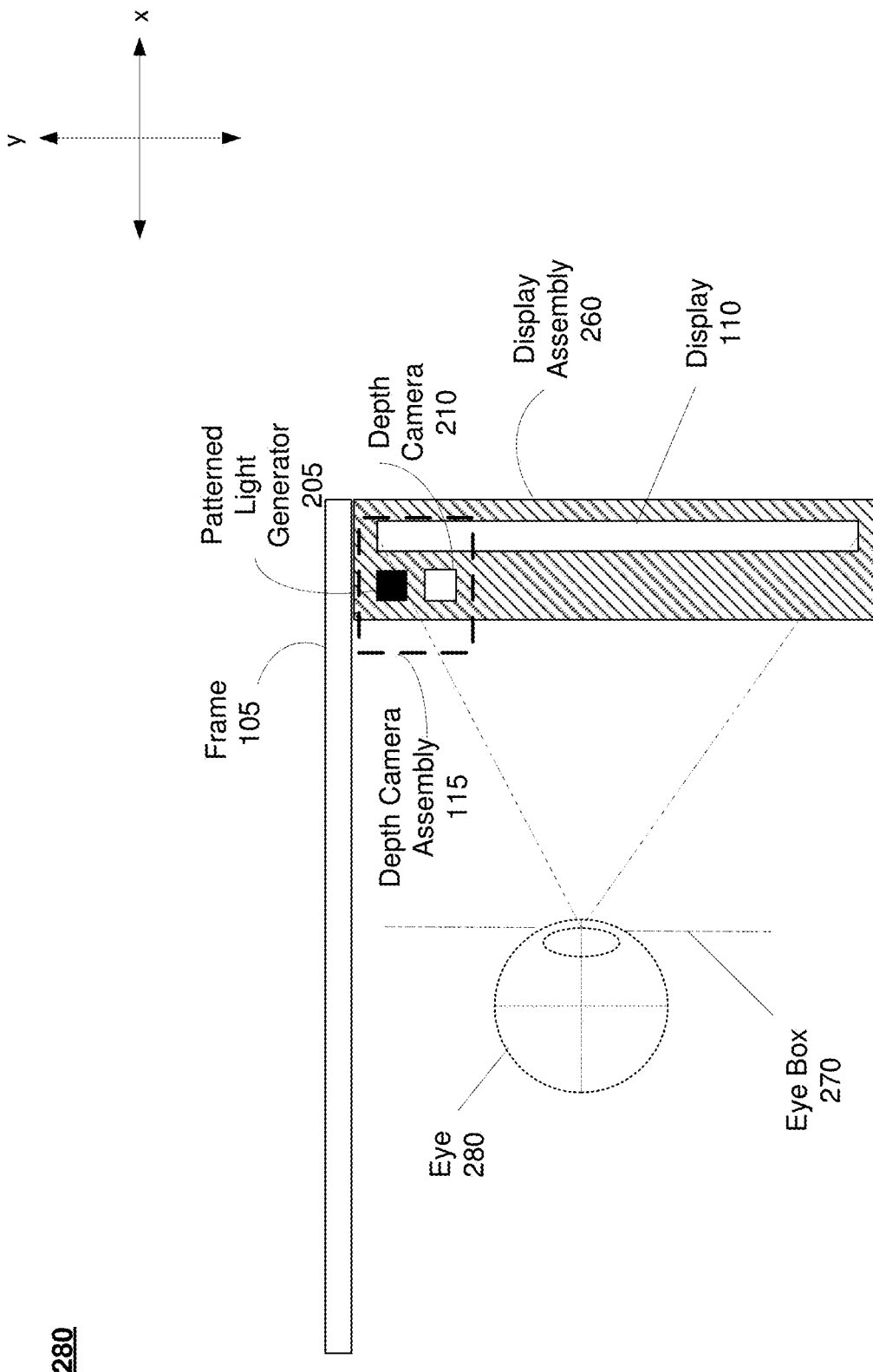
FIG. 2B is a cross-section of an NED, in accordance with an embodiment.

The NED 100 includes a depth camera assembly (DCA) 115 for determining depth information of an object in a target area. The target area may be, e.g., a portion of a local area that surrounds the NED 100 or the eye box 270 of the NED 100. The DCA 115 includes an illumination assembly which illuminates a target area with a structured light pattern and determines the depth information of the object based in part on deformation of the structured light pattern on surfaces of the target area. The illumination assembly may be the patterned light generator 205. In some embodiments, the target area is a user's eye, and the DCA 115 determines information about a user's eye. In some embodiments, the target area is a local environment, and the DCA 115 determines depth information of the local environment. The DCA 115 includes an illumination source assembly, a camera assembly (which may be a depth camera 210), and a controller. The patterned light generator 205 of the DCA 115 may be any of the IC illumination generators described in FIGS. 3-8. The patterned light generator 205 may be embedded behind the depth camera 210 and/or any other detection device within the DCA 115. The patterned light generator 205 may be located anywhere on the HMD separate from the depth camera 210. For example, the patterned light generator 205 may be located on one portion of the frame 105, and the depth camera 210 may be located on a separate portion of the frame 105. The patterned light generator 205 forms a baseline with the depth camera 210 that is used for triangulation calculations and determining a depth of an object. As shown in FIG. 2A, the DCA 115 is located near the frame 105. Locating the DCA 115 near the frame may allow for a longer baseline between the patterned light generator 205 and the depth camera 210. An additional location of the DCA 115 is shown in FIG. 2B.

The illumination source assembly outputs structured light into one or more target areas. In some embodiments, the structured light is interferometric light. In some embodiments, the structured light is a superposition of multiple interferometric patterns. The illumination source assembly includes an illumination source, which may be one or more IC illumination generators described herein, such as an IC patterned light generator, an IC double patterned light generator, a layered IC patterned light generator, an IC multi patterned light generator, or some combination thereof. An IC illumination generator outputs a structured light pattern. An IC illumination source may be any of the IC illumination generators described in further detail with reference to FIGS. 3-8. As noted above, a target area may be, e.g., an eye box of the NED 100 or some portion of the local area surrounding the NED 100. In some embodiments, the illumination source assembly may output structured light into multiple target areas. For example, the illumination source assembly may illuminate multiple eye boxes (i.e., one for each eye) with structured light, the eye box 270 and a portion of the local area, multiple portions of the local area, etc.

A camera assembly of the DCA 115 includes one or more imaging devices which collect the light reflected off of the eye 280 and/or objects in a local environment of the NED 100 and/or any objects in a target area that originates from any of the IC illumination sources described herein. An imaging device may be, e.g., a detector array, camera or video camera, some other device configured to capture light emitted by the IC illumination source, or some combination thereof. There may be one or more imaging devices in the DCA to capture different types of interferometric patterns. Additionally or alternatively, a single imaging device may detect different interferometric patterns. In some embodiments, imaging devices may include optical filters to filter for light of the same wavelength as a light source of an interferometric pattern generator. In some embodiments, an imaging device may include an optical filter to filter for multiple wavelengths for interferometric pattern generators that output light of multiple wavelengths. In some embodiments, an imaging device detects light of different wavelengths simultaneously. In some embodiments, an imaging device detects light of different wavelengths in different imaging frames. For example, a single imaging device could capture different interferometric patterns produced by different phase delays applied by the active phase delay devices described in further detail with reference to FIGS. 3-8. In another example, a first imaging device may capture interferometric light in a first pattern emitted from a first IC illumination source, and a second imaging device may capture a second pattern emitted from a second IC illumination source.

The DCA 115 includes a controller assembly, which determines the initial depth information of objects in a portion of the area surrounding the DCA by comparing the known interferometric pattern output by an IC illumination generator of the illumination source assembly to the detected deformed pattern that results from light reflected off of objects in a target area. Based on initial depth information, a controller may instruct the IC illumination generator to emit a specific interferometric pattern by adjusting an active phase delay device. The controller may also instruct the imaging device to capture images of the emitted interferometric pattern of the IC illumination source. The controller may then determine depth information and/or material properties (e.g., metal, skin, etc.) of objects in the target area. The controller may estimate a position of the eye using the one or more captured images and a model of the eye. Additionally or alternatively, the controller determines an eye's gaze angle, a focal distance, vergence and/or accommodation of the eye 280.

FIG. 2B is a cross-section 280 of an NED, in accordance with an embodiment. The cross-section 280 shows the DCA 115 embedded behind the display assembly 260, as previously described with reference to FIGS. 1 and 2A. The DCA 115 may be located behind the display assembly 260 at any position along they axis, as indicated in FIG. 2B. The DCA 115 may be embedded behind the display assembly 260 near the frame 105, such that the DCA 115 is on a periphery of the eye's 280 field of view. Thus the DCA 115 may be embedded behind the display assembly 260 along any of the edges of the display assembly 260.

Figure 3:
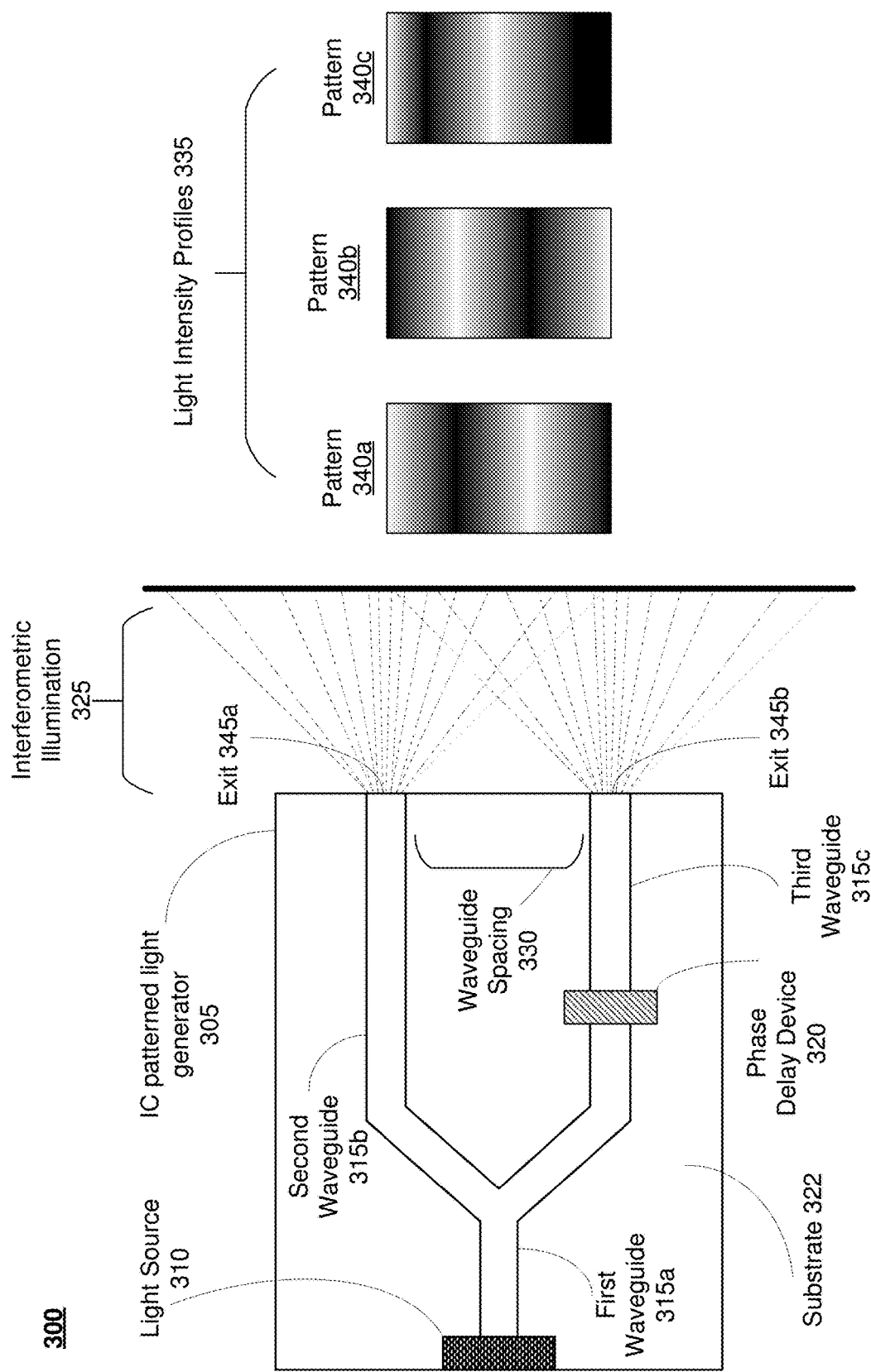
FIG. 3 is a diagram of an IC patterned light generator and example output light intensity profiles, in accordance with an embodiment.

FIG. 3 is a diagram 300 of an IC patterned light generator 305 and example output light intensity profiles 335, in accordance with an embodiment. The IC patterned light generator 305 produces patterned interferometric illumination 325. The patterned interferometric illumination 325 may be used for 3D depth eye tracking, 3D depth face tracking and/or long range depth sensing. The output of the IC patterned light generator 305 is determined by a controller of a DCA (e.g., the DCA 115, which determines which of many light sources are supplied with power, the couplings between waveguides, and the applied phase delays.

The IC patterned light generator 305 includes a light source 310 which produces light that is converted to interferometric illumination 325. The light source 310 may be any light source with spatial coherence capable of producing interferometric illumination and compatible with the IC chip, such as a Vertical External-cavity Surface-emitting Laser (VECSEL), a Vertical-cavity Surface-emitting Laser (VCSEL), a superluminescent diode (SLED), a tunable laser, a quantum dot laser, an edge emitting laser, a laser diode, or any combination of these light sources. The light source 310, and any of the light sources described herein, may emit light of a wavelength outside of a visible spectrum (~380 nm to 750 nm). For example, the light source 310 may emit light in the infrared (IR) band (~750 nm to 1700 nm). This may enable an imaging device to distinguish light associated with an eye tracking system and/or the DCA from light associated with visual content of an artificial reality environment, which is in the visible light spectrum. The light source 310 may be controlled by a controller (not shown), processor, or any other central control system associated with the NED 100. The processor and/or controller is described in further detail with reference to FIG. 9. The power source for the light source 310 may be a power source located on the NED 100.

The light source 310 outputs light to a first waveguide 315a. The light source 310 is thus optically coupled to the first waveguide 315a. For example, the optical coupling can be achieved by an adiabatically tapered waveguide. The adiabatically tapered waveguide can be a separate waveguide from the first waveguide 315a. In other examples, the first waveguide 315a itself is adiabatically tapered. The first waveguide 315a in-couples light from the light source 310. The first waveguide 315a ends in a junction and is split into a second waveguide 315b and a third waveguide 315c. Light propagating in the first waveguide 315a is split between the second waveguide 315b and the third waveguide 315c such that substantially equal amounts of light propagate in the second waveguide 315b and the third waveguide 315c from the first waveguide 315a.

The first waveguide 315a, the second waveguide 315b, the third waveguide 315c (collectively 315), and any of the waveguides described herein are channel waveguides. In some examples, the channel waveguides may be buried channel waveguides. In other embodiments, the waveguides may be ridge waveguides. In other embodiments, the waveguides may be strip-loaded waveguides. The waveguides may be formed from any standard dielectric material with a high refractive index, or any material in which the light from the light source 310 may propagate.

Light propagating in the second waveguide 315b has the same phase as the light output by the light source 310 and propagating in the first waveguide 315b. To generate the interferometric illumination 325, a phase delay device 320 applies a phase delay to light in the third waveguide 315c. The phase delay device 320 is an active phase delay device. An electro-optic modulator phase delay device 320 modulates the phase of the light propagating in the third waveguide 315c, resulting in a phase shift relative to the light propagating in the second waveguide 315b. In other embodiments, the phase delay device 320 is a thermo-optic phase shifter. In other embodiments, the phase delay device 320 is an acousto-optic deflector (AOD). The phase delay device 320, and any of the phase delay devices described herein, may be a micro-electro-mechanical system (MEMS) mirror. A MEMS mirror phase delay device 320 applies a phase delay through translational motion of a mirror, driven by electromagnetic, electrostatic, thermos-electric or piezoelectric effects. For example, a comb-drive may produce resonant translational movement of the MEMS mirror. In other embodiments, the phase delay device 320 is an electro-optic modulator. The phase delay device 320 may be any other standard device capable of producing a phase shift in the light propagating from the first waveguide 315a to the third waveguide 315c. The phase delay device 320 is shown on the third waveguide 315c, but may alternatively be located on the second waveguide 315b. In other embodiments, a phase delay device may be located on each of the second waveguide 315b and third waveguide 315c, such that a phase delay is applied to light propagating in both the second waveguide 315b and the third waveguide 315c, and the applied phase delay is different such that an interferometric illumination 325 is produced from the output light.

The light source 310, the first waveguide 315a, the second waveguide 315b, the third waveguide 315c and the phase delay device 320 are located on a substrate 322. The substrate 322 may be formed from any standard chip substrate material, such as a semiconductor material, silicon, gallium arsenide, aluminum gallium arsenide, silicon on sapphire, etc. The substrate 322 may also be formed from any transparent materials in the visible spectrum band (400 to 700 nm), such as glass, plastic, polymer, PMMA, silica, and any forms of crystals (such as lithium niobate, tellurium dioxide, etc.). A surface of the substrate 322 may be bonded to the NED 100. The light source 310, the first waveguide 315a, the second waveguide 315b, the third waveguide 315c and/or the phase delay device 320 may be bonded to the substrate 322 through any standard bonding technique. Alternatively, any of the light source 310, the first waveguide 315a, the second waveguide 315b, the third waveguide 315c and/or the phase delay device 320 may be formed on the substrate 322 through any standard etching or epitaxial growth technique.

Light exits the second waveguide 315b from an exit 345a and from the third waveguide 315c from an exit 345b. Because light propagating in the third waveguide 315c is phase shifted, light exiting the second waveguide 315b from the exit 345a and the third waveguide 315c from exit 345b periodically constructively and destructively interfere, producing the interference fringes of the patterned interferometric illumination 325. The period between the interference fringes is determined by the physical waveguide spacing 330 between the exit 345a and the exit 345b of the second waveguide 315b and the third waveguide 315c. Thus the spatial frequency of the interferometric illumination 325 depends on the separation distance between the second waveguide 315b and the third waveguide 315c. he relationship between the intensity of the interference fringe pattern at a point X shown in FIG. 3a, the waveguide spacing 330 and the applied phase shift is given by the approximation:

$$I = \cos^2\left(\frac{\pi a \sin(\theta_i)}{\lambda} + \phi_n\right) \quad (1)$$

Where $\phi_n$ is the phase shift, n=1, 2, 3, ... N, and N is an integer number, a represents the center-to-center waveguide spacing, $\lambda$ is the optical wavelength of the illumination, $\theta_i$ is the angle of the path length difference d, and d=a sin($\theta_i$). Hence, by actively applying a phase change $\phi_n$, the fringe patterns are spatially shifted by the desired phase. The spatial frequency of the fringe pattern depends on the waveguide spacing a.

Illustrative examples of the light intensity profiles 335 of the interferometric illumination 325 produced by the IC patterned light generator 305 are shown in FIG. 3. Each of the patterns 340a, 340b and 340c are produced from different phase shifts applied by the phase delay device 320. The lateral location of the nodes, can be adjusted by changing the phase shift applied by the phase delay device 320. For example, the phase delay device 320 may modulate across a range of applied phase shifts, so that the interference fringes scan across the surface of objects in a local environment and/or a user's eye in discrete phase shift steps, or continuous phase shift steps. Thus, in reference to equation (1), the value of $\phi_n$ may be discrete or continuous. The patterned interferometric illumination 325 may then be used in an eye tracking system and/or a DCA to determine information about objects (such as 3D shape and depth of the user's eyes) on which the interferometric illumination 325 is incident, as described in further detail with reference to FIG. 1.

In some examples, the spacing of the fringe pattern may be adjusted to the size of an object being detected. For example, when detecting small 3D objects, the fringe pattern may be finer and the distance between phase shift steps may be smaller. Conversely, for large 3D objects, the patterned interferometric illumination 325 may be tuned for larger-grain sensing by increasing the spacing of the fringe pattern and steps between phase shifts.

Figure 4:
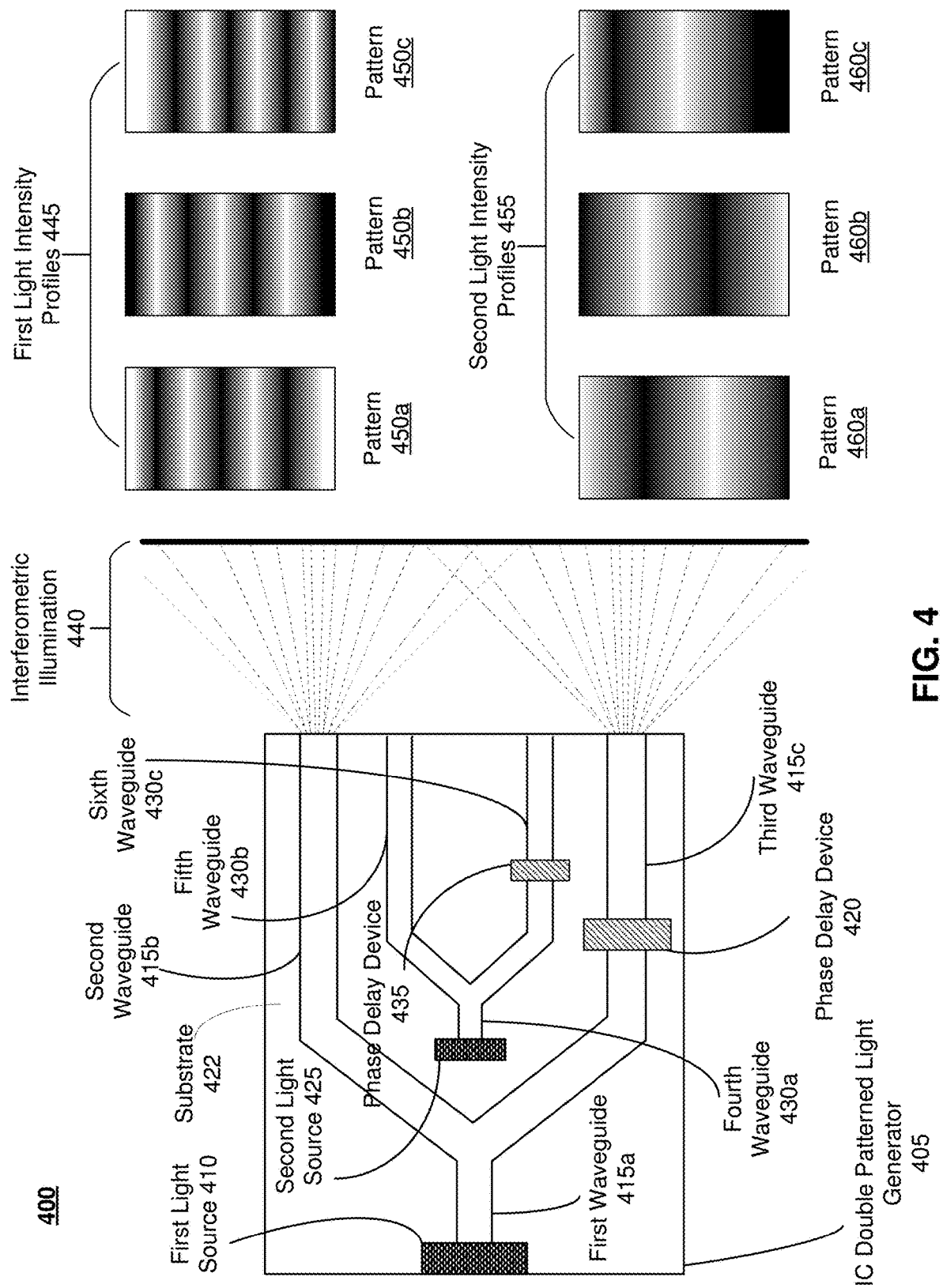
FIG. 4 a diagram of an IC double patterned light generator and example output light intensity profiles, in accordance with an embodiment.

As shown in FIG. 4, phase delay devices 420 and 435 are located on the third waveguide 415c and the sixth waveguide 430c, respectively. However, in other examples, the phase delay device 420 and/or the phase delay device 435 may not be on the IC double patterned light generator 405. In this example, the interferometric illumination 440 is produced from the lateral distance between the third waveguide 415c and the second waveguide 415b, and/or the lateral distance between the fifth waveguide 430b and the sixth waveguide 430c. As described herein, any of the phase delay devices may be optional, and can thus be optionally removed from any of the patterned light generators described in FIGS. 3-8.

"Structured light" may be referred to herein as "patterned interferometric illumination," "interferometric illumination," or "patterned light" as the structure of light is generated from light interference. The structure of the structured light is determined by the fringe pattern, which may be referred to herein as "interferometric pattern," "structured light pattern," "pattern of interferometric illumination," "interference fringe pattern," and/or "fringe illumination pattern." The density of the fringes determines how close together clusters of light are to each other in the structured light.

FIG. 4 is a diagram 400 of an IC double patterned light generator 405 and example output light intensity profiles, in accordance with an embodiment. The IC double patterned light generator 405 produces a number of different forms of patterned interferometric illumination 340, which may be used in a DCA to determine information about objects in a target area. The output of the IC double patterned light generator 405 is determined by a controller of a DCA (e.g., the DCA 115), which determines which of many light sources are supplied with power, the couplings between waveguides, and the applied phase delays.

The IC double patterned light generator 405 may be the IC patterned light generator 305 with the addition of a second light source 425 and waveguide structures to output a second set of patterned interferometric illumination. Thus a first light source 410, a first waveguide 415a, a second waveguide 415b, a third waveguide 415c and a substrate 422 may be the same as the first light source 310, the first waveguide 315a, the second waveguide 315b, the third waveguide 415c and the substrate 322, respectively.

A first light source 410 and a second light source 425 are located on the substrate 422 of the IC double patterned light generator 405. The first light source 410 and the second light source 425 may be the same light source as the first light source 310, and are described in further detail with reference to FIG. 1. In some embodiments, the first light source 410 and the second light source 425 output light of the same wavelength. In other embodiments, the first light source 410 outputs light of a first wavelength, and the second light source 425 outputs light of a second wavelength. The first light source 410 is independently controlled from the second light source 425, such that, for example, the first light source 410 may emit light when the second light source 425 does not emit light. In some examples, the first light source 410 and the second light source 425 may output light simultaneously.

When the first light source 410 and the second light source 425 output light simultaneously, the resulting interferometric illumination 440 contains two different fringe patterns, where the fringe pattern resulting from the second light source 425 is closer together than the fringe pattern resulting from the first light source 410. In these examples, a detection device, such as the depth camera 210 as shown in FIG. 2, may be configured to distinguish between the two different fringe patterns. For example, the first light source 410 may have a different wavelength from the second light source 425, and the detection device may include two separate sensors tuned to each of the two different wavelengths with optical wavelength filters. In some examples, a single sensor may contain different pixels, each of which detects one of the two different wavelengths of the first light source 410 and the second light source 425. In some examples, the first light source 410 may have a separate polarization from the second light source 425. In these examples, the detection device may include two separate sensors with separate optical polarization filters to match the polarization of the first light source 410 and the second light source 425. In other examples, the detection device may include a single sensor with different pixels configured to detect different light polarizations.

In other examples, the first light source 410 may have a different coded frequency modulation than the second light source 425. In this case, a detection device may include two separate sensors, each of which includes an optical filter that is tuned to one of the two different frequency modulations. In other examples, a detection device may include a single sensor with different pixels configured to detect the different frequency modulations.

The second light source 425, a fourth waveguide 430a, a fifth waveguide 430b, a sixth waveguide 430c and a phase delay device 435 are configured and operate in the same way as the light source 310, the first waveguide 315a, the second waveguide 315b, the third waveguide 315c and the phase delay device 320, respectively, and as described with reference to FIG. 3. Similarly, the first light source 410, the first waveguide 415a, the second waveguide 415b, the third waveguide 415c and the phase delay device 420 are configured and operate in the same way as the light source 310, the first waveguide 315a, the second waveguide 315b, the third waveguide 315c and the phase delay device 320, respectively, and as described with reference to FIG. 3.

Thus the second light source 425 outputs light to the fourth waveguide 430a. The second light source 425 is optically coupled to the fourth waveguide 430a. The fourth waveguide 430a in-couples light from the second light source 425. The fourth waveguide 430a ends in a junction and is split into the fifth waveguide 430b and the sixth waveguide 430c. Light propagating in the fourth waveguide 430a is split between the fifth waveguide 430b and the sixth waveguide 430c such that substantially equal amounts of light propagate in the fifth waveguide 430b and the sixth waveguide 430c from the fourth waveguide 430a.

Light propagating in the fifth waveguide 430b has the same phase as the light output by the second light source 425 and propagating in the fourth waveguide 430b. To generate the interferometric illumination 440, the phase delay device 435 applies a phase delay to light in the sixth waveguide 430c. The phase delay device 435 is an active phase delay device. The phase delay device 435 may be any of the phase delay devices described with reference to FIG. 3. The phase delay device 435 is shown applying a phase delay to the sixth waveguide 430c, however in other embodiments, the phase delay device 435 may be located on the fifth waveguide 430b and apply a phase delay to light propagating in the fifth waveguide 430b. In other embodiments, a phase delay device may be located on both the fifth waveguide 430b and the sixth waveguide 430c.

Light exits the fifth waveguide 430b and the sixth waveguide 430c. Because of the phase delay applied by the phase delay device 435, the output light from the fifth waveguide 430b is separated by a phase shift from the output light from the sixth waveguide 430c, and thus the light periodically interferes, producing a patterned interferometric illumination 440. The distance between interferometric fringes in the interferometric illumination 440 output from the fifth waveguide 430b and the sixth waveguide 430c may be larger than the fringe distance output by the second waveguide 415b and the third waveguide 415c due to the smaller lateral distance between the fifth waveguide 430b and the sixth waveguide 430c. The relationship between these parameters is discussed in further detail with reference to FIG. 3.

Illustrative examples of the light intensity profiles 445 and 455 of the interferometric illumination 440 produced by the IC double patterned light generator 405 are shown in FIG. 4 Each of the patterns 450a, 450b and 450c are produced from different phase shifts applied by the phase delay device 420 to light propagating in the third waveguide 415. Each of the patterns 460a, 460b and 460c are produced from different phase shifts applied by the phase delay device 435 to light propagating in the sixth waveguide 430c. The spacing lateral location of the nodes in the fringe patterns can be adjusted by changing the phase shift applied by the phase delay devices 435 and 420. The patterned interferometric illumination 440 may then be used in a DCA to determine information about objects on which the interferometric illumination 440 is incident, as described in further detail with reference to FIG. 1.

In some examples in which the IC double patterned light generator 405 is used for short range sensing (i.e. 15-20 mm from the IC double patterned light generator 405) the interferometric illumination 440 may contain both a fringe pattern with wide spacing between fringes and a fringe pattern with small spacing between fringes. In some examples in which the IC double patterned light generator 405 is used for long range sensing (i.e. 0.5-1 m from the IC double patterned light generator 405) the interferometric illumination 440 may contain both a fringe pattern with wide spacing and a fringe pattern with small spacing between fringes.

The IC double patterned light generator 405 has two separate light sources and associated waveguide assemblies for generating the interferometric illumination 440. In other embodiments, the IC double patterned light generator 405 may contain more than two light sources and optically coupled waveguide assemblies. For example, a third light source may be added to the IC double patterned light generator 405 that duplicates the structure of the light source 310, the first waveguide 315a, the second waveguide 315b, the third waveguide 315c and the phase delay device 320 on the substrate 422 between the fifth waveguide 430b and the sixth waveguide 430c.

Figure 5A:
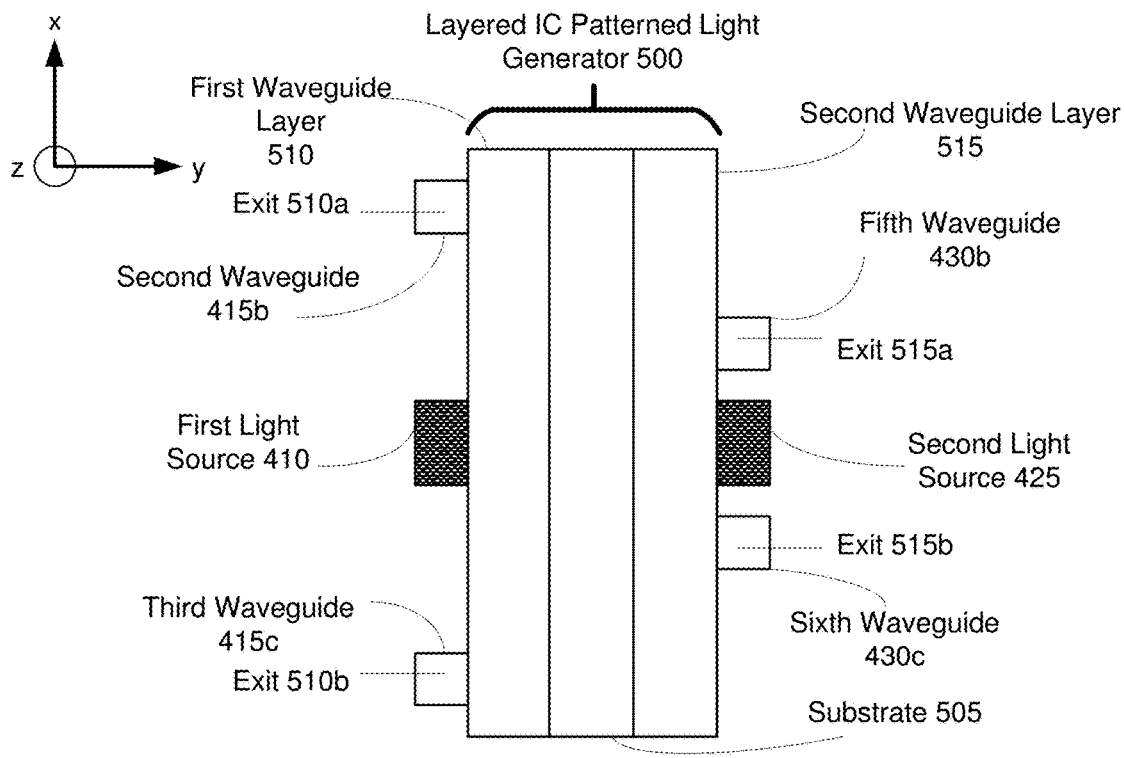
FIG. 5A is a side view of a layered IC patterned light generator, in accordance with an embodiment.

FIG. 5A is a side view of a layered IC patterned light generator 500, in accordance with an embodiment. The layered IC patterned light generator 500 is structured such that the first light source 410, the first waveguide 415a, the second waveguide 415b, the third waveguide 415c and the phase delay device 420 (not shown) are placed on a separate waveguide layer 510 from the second light source 425, the fourth waveguide 430a, the fifth waveguide 430b, the sixth waveguide 430c, and the phase delay device 435 (not shown), which are located on a second waveguide layer 515. A substrate 505 separates the first waveguide layer 510 from the second waveguide layer 515. The output of the layered IC patterned light generator 500 is determined by a controller of a DCA (e.g., the DCA 115, which determines which of many light sources are supplied with power, the couplings between waveguides, and the applied phase delays.

Figure 5B:
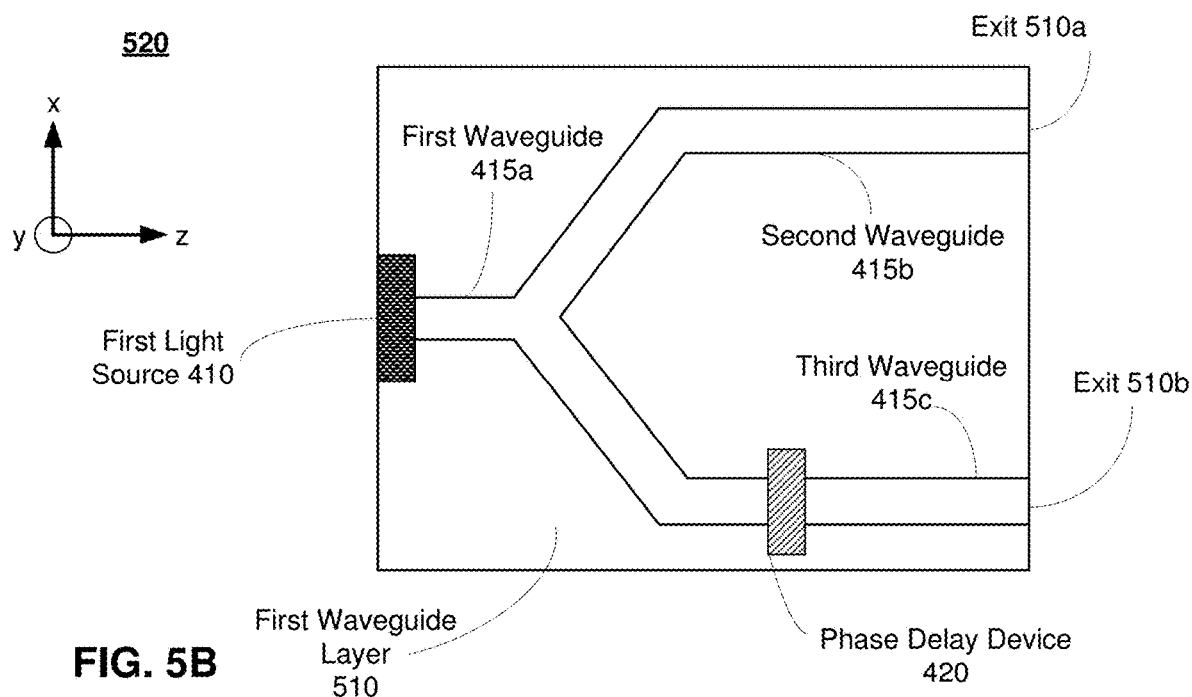
FIG. 5B is a first overhead view of the layered IC patterned light generator, in accordance with an embodiment.
Figure 5C:
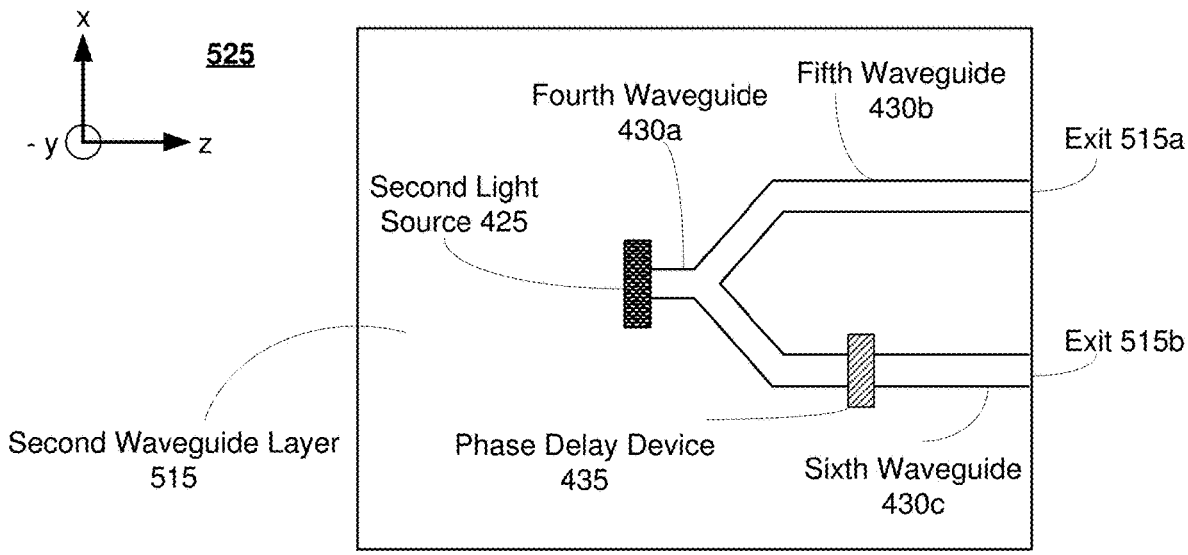
FIG. 5C is a second overhead view of the layered IC patterned light generator, in accordance with an embodiment.

For ease of illustration, the side view shows only the edges of exits 510a, 510b, 515a and 515b of the second waveguide 415b, the third waveguide 415c, the fifth waveguide 430b and the sixth waveguide 430c, respectively. Additional portions of the second waveguide 415b and the third waveguide 415c couple to the first waveguide 415a and the first light source 410, as shown in FIG. 5B. Additional portions of the fifth waveguide 430b and the sixth waveguide 430c couple to the fourth waveguide 430a and the second light source 425, as shown in FIG. 5C.

The first waveguide layer 510 and second waveguide layer 515 may be any standard chip substrates, such as a semiconductor material, silicon, gallium arsenide, silicon on sapphire, etc. The substrate 505 may be formed from an electrically insulating material to reduce electrical noise between the first waveguide layer 510 and the second waveguide layer 515. Additionally, the substrate 505 may be thermally insulating, such that temperature generated by the first light source 410 and/or the second light source 425 is not transferred between the first waveguide layer 510 and the second waveguide layer 515. The first waveguide layer 510 and the second waveguide layer 515 may be bonded to the substrate 505 using any standard bonding technique.

The layered IC patterned light generator 500 may improve the manufacturing flexibility of an IC patterned light generator with multiple light sources and waveguide assemblies, since the first light source 410, the first waveguide 415a, the second waveguide 415b, the third waveguide 415c and the phase delay device 420 may be grown, etched, bonded, or otherwise added to the waveguide layer 510 separately from the second light source 425, the fourth waveguide 430b, the fifth waveguide 430b, the sixth waveguide 430c, and the phase delay device 435. This may improve the yield associated with manufacturing the layered IC patterned light generator 500.

FIG. 5B is a first overhead view 520 of the layered IC patterned light generator 500, in accordance with an embodiment. The first overhead view 520 shows the first waveguide layer 510. The first light source 410, the first waveguide 415a, the second waveguide 415b, the third waveguide 415c and the phase delay device 420 are located on the first waveguide layer 510, and are described in further detail with reference to FIG. 4. Light exits the layered IC patterned light generator 500 at the exit 510a and the exit 510b.

FIG. 5C is a second overhead view 525 of the layered IC patterned light generator 500, in accordance with an embodiment. The second overhead view 525 shows the second waveguide layer 515. The second light source 425, the fourth waveguide 430a, the fifth waveguide 430b, the sixth waveguide 430c and the phase delay device 435 are located on the second waveguide layer 515, and are described in further detail with reference to FIG. 4. Light exits the layered IC patterned light generator 500 at the exit 515a and the exit 515b.

The first light source 410 is independently controlled from the second light source 425, such that, for example, the first light source 410 may emit light when the second light source 425 does not emit light. Thus the layered IC patterned light generator 500 may toggle between different patterned interferometric illuminations, produced by waveguides located on either side of a middle substrate 505.

As shown in FIGS. 5A-5B, light exits the layered IC patterned light generator 500 at the exit 510a, the exit 510b, the exit 515a and the exit 515b in the same direction. In other embodiments, light exits the layered IC patterned light generator 500 in opposite directions. For example, the first light source 410, the first waveguide 415a, the second waveguide 415b, the third waveguide 415c and the phase delay device 420 may be oriented on the first waveguide layer 510 such that the exits 510a and 510b are located at the opposite side of the first waveguide layer 510 and light exits the exits 510a and 510b in a −z direction. Thus the angle between the exits 510a and 510b and the exits 515a and 515b is 180 degrees. For example, the light output by the exits 510a and 510b may be used to determine information about a local area, whereas light output by the exits 515a and 515b may be used to determine information about a user's eye. In other embodiments, the angle between the exits 510a and 510b and the exits 515a and 515b may be any angle, and any of the elements shown in FIGS. 5A-5C may be oriented to achieve the desired angle. For example, the exits 515a and 515b may be oriented in a manner to facilitate hand tracking (e.g., −45 degrees relative to the z-axis), and the exits 510a and 510b may be oriented to illuminate the local area (e.g., 0 degrees relative to the z-axis).

Figure 6:
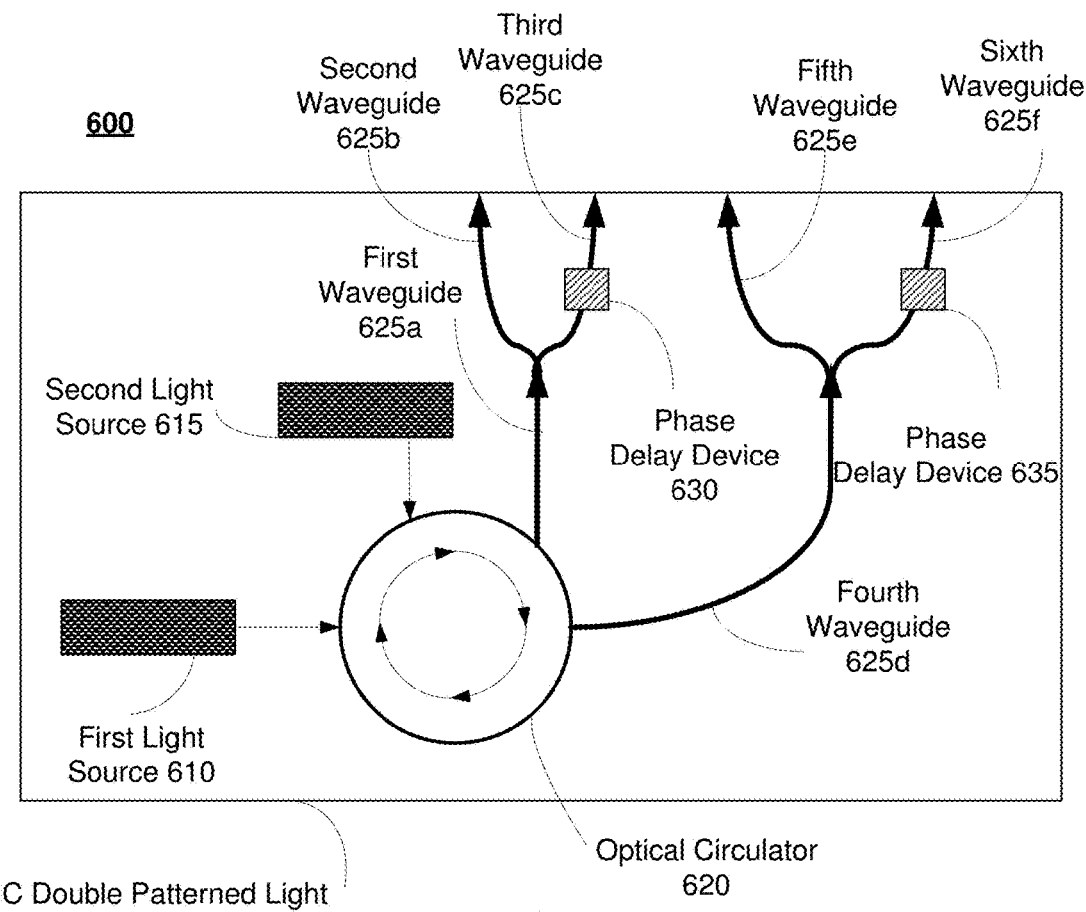
FIG. 6 is a diagram of an IC double patterned light generator, in accordance with an embodiment.

FIG. 6 is a diagram 600 of an IC double patterned light generator 605, in accordance with an embodiment. The IC double patterned light generator 605 produces two different patterns of interferometric illumination, which may be used in the context of eye tracking, DCA, or any other system that uses a patterned light source. The output of the IC double patterned light generator 605 is determined by a controller of a DCA (e.g., the DCA 115), which determines which of many light sources are supplied with power, the couplings between waveguides, and the applied phase delays.

A first light source 610 and a second light source 615 are located on the IC double patterned light generator 605. The first light source 610 and the second light source 615 may be any of the light sources described in further detail with reference to FIG. 3. In some embodiments, the first light source 610 and the second light source 615 emit light of the same wavelength. In other embodiments, the first light source 610 and the second light source 615 emit light of different wavelengths.

Both the first light source 610 and the second light source 615 are optically coupled to an optical circulator 620. This may be through short waveguides that in-couple light from the first light source 610 and the second light source 615 and out-couple the light to the optical circulator 620. The optical circulator 620 has four ports, but may have additional ports to in-couple light if additional light sources are added to the IC double patterned light generator 605. The optical circulator 620 multiplexes the light from the first light source 610 and the second light source 615 such that light in-coupled from the first light source 610 is out-coupled from the optical circulator 620 into a first waveguide 625a. Light from the second light source 615 is out-coupled from the optical circulator 620 into a fourth waveguide 625d. In some examples, the optical circulator 620 may apply a phase shift to light from the first light source 610 and the second light source 615. However, the phase shift that results from the optical circulator 620 is the same for both input light sources, so the light propagating in the first waveguide 625a and the fourth waveguide 625d have the same relative phase difference as light from the first light source 610 and the second light source 615.

Both the first waveguide 625a and the fourth waveguide 625d end in a junction, such that light exiting the first waveguide 625a and the fourth waveguide 625d is divided between two separate waveguides. Light from the first waveguide 625a is split between a second waveguide 625b and a third waveguide 625c, while light from the fourth waveguide is split between a fifth waveguide 625e and a sixth waveguide 625f. The junction at the end of the first waveguide 625a and the fourth waveguide 625d may be curved, such that the sides of the waveguides are curved. This may reduce leakage of light out of the waveguides.

Light propagating in the second waveguide 625b has the same phase as light propagating in the first waveguide 625a. A phase delay device 630 located on the third waveguide 625c applies a phase delay, such that light exiting the third waveguide 625c has a phase shift from the light exiting the second waveguide 625b. The phase shift results in periodic interference and a patterned interferometric illumination. The phase delay device 630 may be any of the phase delay devices as described in further detail with reference to FIG. 3. As shown, the phase delay device 630 applies a phase shift to the third waveguide 625c, however in other embodiments the phase delay device 630 may be located on the second waveguide 625b. In other embodiments, phase delay devices may be located on both the second waveguide 625b and the third waveguide 625c.

Light propagating in the fifth waveguide 625e has the same phase as light propagating in the fourth waveguide 625d. A phase delay device 635 located on the sixth waveguide 625f applies a phase delay, such that light exiting the sixth waveguide 625f is phase shifted from the light exiting the fifth waveguide 625e. The phase shift results in periodic interference and a patterned interferometric illumination. The phase delay device 635 may be any of the phase delay devices as described in further detail with reference to FIG. 3. As shown, the phase delay device 635 applies a phase shift to the sixth waveguide 625f, however in other embodiments the phase delay device 635 may be located on the fifth waveguide 625d. In other embodiments, phase delay devices may be located on both the fifth waveguide 625e and the sixth waveguide 625f.

The waveguides on the IC double patterned light generator 605 may be formed or structured like the waveguides described in further detail with reference to FIG. 3.

The IC double patterned light generator 605 thus produces two different patterns of structured interferometric illumination, which exit the IC doubled patterned light generator 605 in the same direction. The first light source 610 and second light source 615 may be independently controlled, such that in response to a controller, the IC double patterned light generator 605 outputs different patterns of structured interferometric illumination when light is emitted or not emitted from any of the light sources on the IC double patterned light generator 605. For example, the IC double patterned light generator 605 outputs different structured interferometric illumination when the second light source 615 emits light and the first light source 610 does not emit light than when the first light source 610 emits light and the second light source 615 does not emit light.

The IC double patterned light generator 605 may have any number of additional optical circulators 620 with any number of additional light sources, additional waveguides and additional phase delay devices. For example, a third light source may be added and optically coupled to the optical circulator 620 which may out-couple light associated with the third light source to an additional waveguide with an additional phase delay device.

Figure 7:
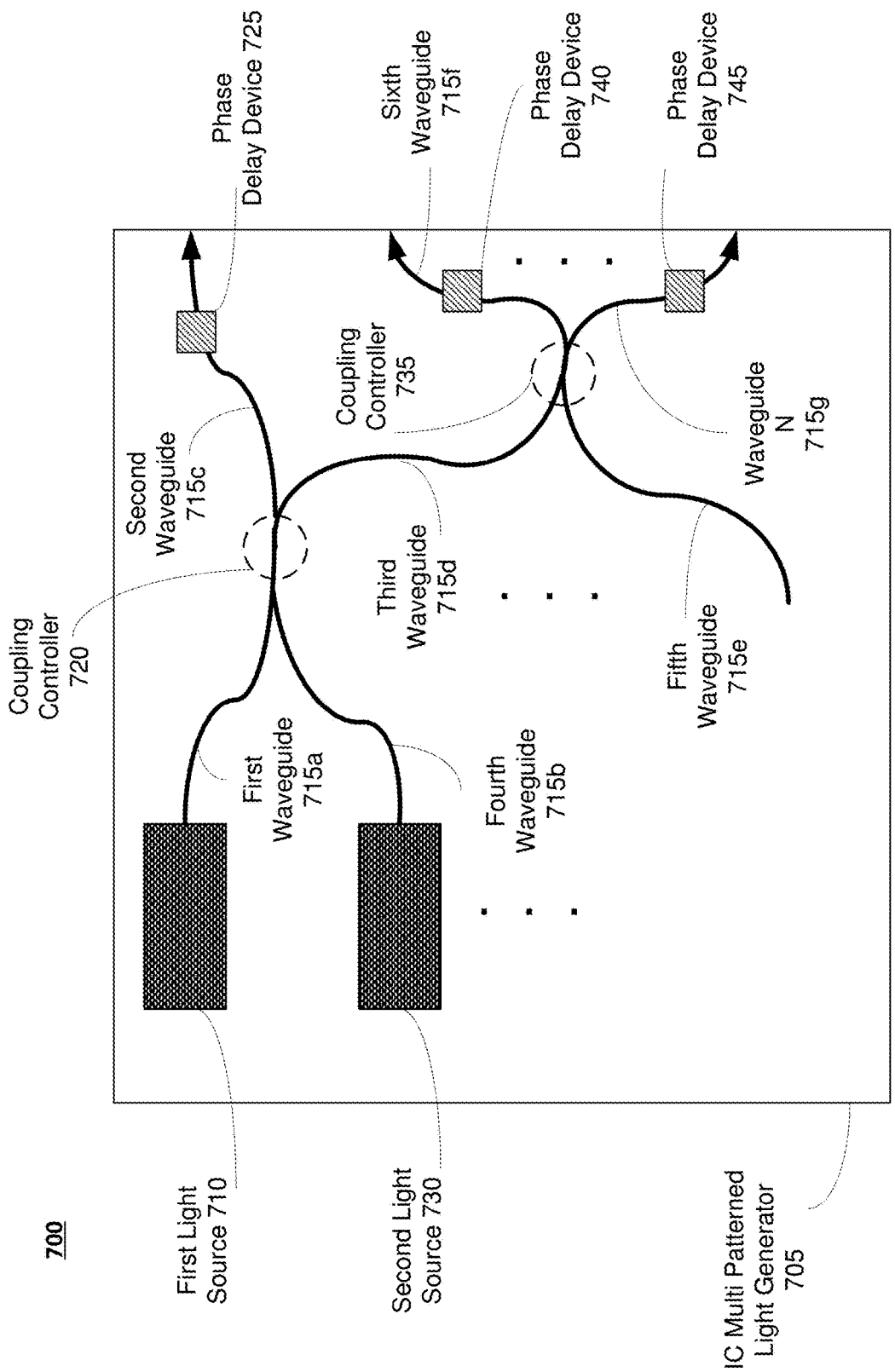
FIG. 7 is a diagram of an IC multi patterned light generator, in accordance with an embodiment.

FIG. 7 is a diagram 700 of an IC multi patterned light generator 705, in accordance with an embodiment. The IC multi patterned light generator 705 produces multiple forms of patterned interferometric illumination, which may be used in the context of an eye tracking assembly, a DCA, or any other system that uses a patterned light source. The output of the IC multi patterned light generator 705 is determined by a controller of a DCA (e.g., the DCA 115, which determines which of many light sources are supplied with power, the couplings between waveguides, and the applied phase delays.

The IC multi patterned light generator 705 may have any number of light sources. As shown, a first light source 710 and a second light source 730 are located on the IC multi patterned light generator 705, and may be any of the light sources as described with reference to FIG. 3. The second light source 730 is optional; in other examples, the IC multi patterned light generator 705 may have only the first light source 710, first waveguide 715a, second waveguide 715c and phase delay device 725. In some embodiments, the light sources output light of the same wavelength. In other embodiments, the light sources output light of different wavelengths. The light sources are each optically coupled to a series of waveguides that form an optical path from the light source to an exit of the IC multi patterned light generator 705.

The optical paths leading from any number of light sources to the exits of the IC multi patterned light generator 705 are curved such that transitions between waveguides are smooth and have minimal coupling loss. Thus, for example, the transition between the fourth waveguide 715b and the third waveguide 715d via the coupling controller 720 is curved to have minimal coupling loss.

In the optical path leading from the light sources to the exits of the IC multi patterned light generator 705 there are any number of coupling controllers, such as a coupling controller 720 and a coupling controller 735. In some examples, the coupling controller 720 and/or 735 may be tuned using thermal or electro-optical actuation in the coupling. The coupling controllers 720 and 735 may act as switches, such that they redirect incoming light along different output waveguide paths. For example, both light from the first light source 710 and light from the second light source 730 are in-coupled along a first waveguide 715a and a fourth waveguide 715b to the coupling controller 720. The coupling controller may output light from the first light source 710 along a second waveguide 715c or a third waveguide 715d. Similarly, the coupling controller may output light from the second light source 730 along the second waveguide 715c or the third waveguide 715d. Additionally or alternatively, the coupling controller may split light from a single light source along multiple optical paths in the IC multi patterned light generator 705. For example, the coupling controller 720 may output light from the first light source 710 into both the second waveguide 715c and the third waveguide 715d. Thus a single light source may be used to generate multiple interferometric patterns and light from a single light source may be directed along multiple optical paths.

In some embodiments, along the optical path, a coupling controller combines light originating from different light sources, and a phase delay device applies a phase delay to light propagating in the waveguide. For example, the first light source 710 is optically coupled to the first waveguide 715a. The second light source 730 is optically coupled to the fourth waveguide 715b. A coupling controller 720 combines light from the first waveguide 715a and the fourth waveguide 715b.

The coupling controller 720 and the coupling controllers described herein are active coupling controllers, which may be controlled by a controller. The controller is described in further detail with reference to FIGS. 2 and 9. The coupling controller 720 and coupling controller 735 combine light in-coupled from input waveguides according to a coupling ratio, which may be adjusted and actively controlled by the controller. The coupling controller 720 may couple light from the input waveguides with coupling ratios ranging from 0 to 1. The light from the input waveguides then propagates to output waveguides according to the coupling ratio of the coupling controller.

For example, light from the first light source 710 propagates in the first waveguide 715a. The first waveguide 715a is an input waveguide to the coupling controller 720. Light from the second light source 730 propagates in the fourth waveguide 715b. The fourth waveguide is an input waveguide to the coupling controller 720. The coupling controller 720 combines light from the first waveguide 715a and the fourth waveguide 715b according to a coupling ratio. The combined light then propagates to the second waveguide 715c and the third waveguide 715d.

A phase delay device 725 located on the second waveguide 715c applies a phase shift to light propagating in the second waveguide 715c. The phase shifted light then exits from the second waveguide 715c. The exiting light from the second waveguide 715c is transformed from the first light source 710 by the applied phase shift from the phase delay device 725 and combined light from the second light source 730 as combined according to a coupling ratio by the coupling controller 720.

The third waveguide 715d is an input waveguide to the coupling controller 735. A fifth waveguide 715e is also an input waveguide to the coupling controller 735. Light from any of the additional light sources (not shown) propagates in the fifth waveguide 715e. The coupling controller 735 combines the light from the third waveguide 715d with the light from the fifth waveguide 715e according to a coupling ratio. The coupling controller 720 is independently controllable from the coupling controller 735, such that the coupling ratio applied at the coupling controller 720 may be different from the coupling ratio applied at the coupling controller 735. The combined light from the third waveguide 715d and the fifth waveguide 715e is output to a sixth waveguide 715f and a waveguide N 715g. A phase delay device 740 located on the sixth waveguide 715f applies a phase delay to light propagating in the sixth waveguide 715f. A phase delay device 745 located in waveguide N 715g applies a phase delay to light propagating in the waveguide N 715g. Light then exits the sixth waveguide 715f and the waveguide N 715g.

The exiting light from the sixth waveguide 715f is transformed from the light exiting the second light source 730 by the combined light from the first light source 710 in-coupled by the coupling controller 720, light combined from the fifth waveguide 715 in-coupled by the coupling controller 735, and a phase shift applied by the phase delay device 740. The exiting light from the second waveguide 715c, the sixth waveguide 715f, and the waveguide N 715 produce an interferometric illumination pattern, which may be controlled by any of the coupling controllers and phase delay devices. The coupling controllers and phase delay devices allow for many permutations of combinations of light from any of the light sources located on the IC multi patterned light generator 705 and phase shifts applied by the phase delay devices. There may be any N waveguides to combine light from any number of desired light sources. While phase delay devices are shown in FIG. 7 as located on exit waveguides, additional phase delay devices may be located on any of the waveguides, allowing for phase shifts to be applied before coupling controllers and any number of different phase shifts to be applied anywhere on the optical path from the light sources to the exit waveguides of the IC multi patterned light generator 705.

Figure 8:
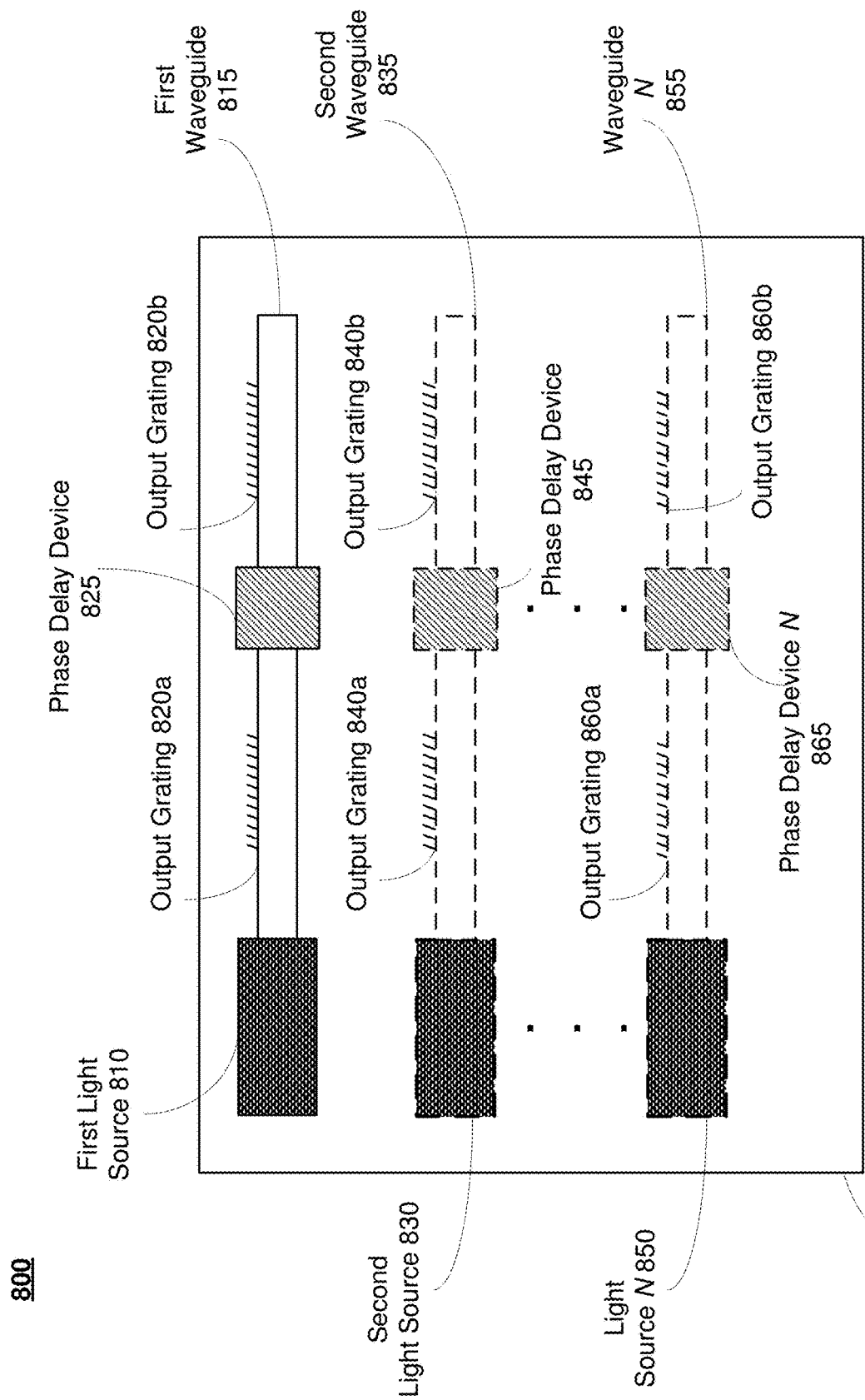
FIG. 8 is a diagram of an IC multi patterned light generator, in accordance with an embodiment.

FIG. 8 is a diagram 800 of an IC multi patterned light generator 805, in accordance with an embodiment. The IC multi patterned light generator 805 produces multiple forms of patterned interferometric illumination, which may be used in a DCA. The output of the IC multi patterned light generator 805 is determined by a controller, which determines which of many light sources are supplied with power, and the phase delay applied to light propagating in any of the N waveguides located on the IC multi patterned light generator 805. The output of the IC multi patterned light generator 805 is determined by a controller of a DCA (e.g., the DCA 115), which determines which of many light sources are supplied with power, the couplings between waveguides, and the applied phase delays.

The IC multi patterned light generator 805 may have any N number of light sources. As shown, a first light source 810, a second light source 830, and an Nth light source 850 are located on the IC multi patterned light generator 805, and may be any of the light sources as described with reference to FIG. 3. Thus the second light source 830, second waveguide 835, output grating 840a, output gratin 840b, phase delay device 845, light source N 850, waveguide N 855, output grating 860a, output grating 860b, and phase delay device N 865 are optional. Each of the light sources on the IC multi patterned light generator 805 is independently controllable, such that, for example, the first light source 810 may emit light while the second light source 830 does not emit light.

Each of the light sources located to the IC multi patterned light generator 805 is optically coupled to a waveguide.

Thus the first light source 810 is optically coupled to a first waveguide 815, and the second light source 830 is optically coupled to a second waveguide 835. Each waveguide is independently coupled to each light source. At a first distance from the light source, each waveguide may have an output grating. For example, at a first distance from the first light source 810, the first waveguide 815 has an output grating 820*a*. At the same first distance from the second light source 830, the second waveguide 835 has an output grating 840*a*. The output gratings described herein are configured to out-couple a portion of light propagating within the waveguides. The output gratings may be, e.g., a diffraction grating, a holographic grating, an apodized grating, one or more cascaded reflectors, one or more prismatic surface elements, an array of holographic reflectors, some other structure that out-couples light from a waveguide, or some combination thereof. In some embodiments, the output gratings are passive output gratings. In other embodiments, the output gratings are active gratings, such that the out-coupling of light is dynamically controllable. For example, active output gratings may be acousto-optic devices, electro-optic devices, or any other device capable of actively out-coupling light from the waveguide. The output gratings may output any desired fraction of the light propagating in the waveguides. A portion of the light from the first light source 810 exits the first waveguide 815 at the output grating 820*a*.

At a second distance from the first light source 810, a phase delay device 825 applies a phase shift to some of the remaining light from the first light source 810 in the first waveguide 815. The phase shifted light then propagates in the first waveguide 815 to an output grating 820*b*, located at a third distance from the first light source 810. Some of the light phase shifted by the phase delay device 825 exits the output grating 820*b*. The light exiting the output grating 820*a* and the output grating 820*b* together create a patterned interferometric illumination.

The structure of the first light source 810, the first waveguide 815, the output gratings 820*a* and 820*b*, and the phase delay device 825 may be replicated any N times on the IC multi patterned light generator 805. Thus the second light source 830, the second waveguide 835, the output gratings 840*a* and 840*b*, and the phase delay device 845 are configured and operate the same way as the first light source 810, the first waveguide 815, the output gratings 820*a* and 820*b*, and the phase delay device 825. The first light source 810 is aligned with the second light source 830 and the light source N 850. The output gratings 820*a*, 840*a* and 860*a* are aligned, such that each output grating is the same distance from the light sources. Similarly, the output gratings 820*b*, 840*b* and 860*b* are aligned, such that each output grating is the same distance from the light sources.

The light sources on the IC multi patterned light generator 805 may all output the same wavelength of light. In other embodiments, the light sources output different wavelengths of light. Each phase delay device is independently controllable, such that a phase shift applied by the phase delay device 825 may be different from the phase shift applied by the phase delay device 845. Additionally or alternatively, when the output gratings are dynamic, each output grating may be independently controllable, such that light output by the output grating 820*a* may be different from light output by the output grating 840*a*, for example.

Light exiting any of the N waveguides at the output gratings combines to form structured light. In some examples in which the first light source 810, the second light source 830, and the light source N 850 output the same wavelengths of light, the structured light may be patterned interferometric illumination. In examples in which the light sources output different wavelengths of light, the structured light may be a superposition of different interferometric patterns, each produced by different sets of light sources, output gratings, and waveguides. The pattern of the interferometric illumination is determined by the number of light sources, the wavelengths output by the light sources, the coupling gratings, and the phase shifts applied by the phase delay devices. Multi permutations and combinations of wavelengths and phase shifts may be created, such that the IC multi patterned light generator 805 is capable of outputting multiple different patterns of interferometric illumination.

Figure 9:
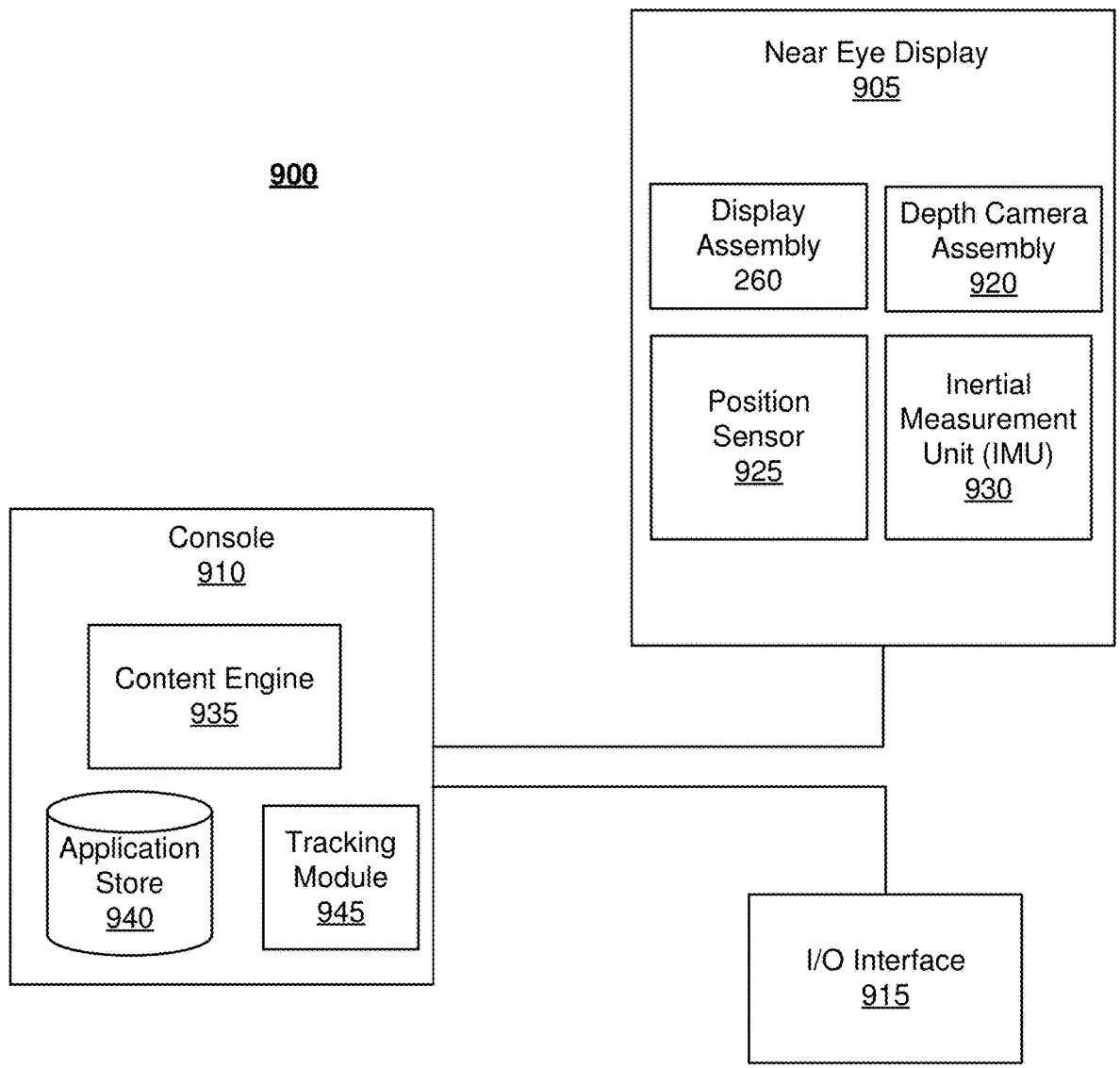
FIG. 9 is a block diagram of a NED system with an eye tracker, in accordance with an embodiment.

FIG. 9 is a block diagram of a near-eye-display system 900, in accordance with an embodiment. The near-eye-display system 900 may operate in an artificial reality system environment. The near-eye-display system 900 shown by FIG. 9 comprises a near-eye-display 905 and an input/output (I/O) interface 915 that are coupled to the console 910. While FIG. 9 shows an example near-eye-display system 900 including one near-eye-display 905 and one I/O interface 915, in other embodiments any number of these components may be included in the near-eye-display system 900. For example, there may be multiple near-eye-displays 905 each having an associated I/O interface 915, with each near-eye-display 905 and I/O interface 915 communicating with the console 910. In alternative configurations, different and/or additional components may be included in the near-eye-display system 900. Additionally, functionality described in conjunction with one or more of the components shown in FIG. 9 may be distributed among the components in a different manner than described in conjunction with FIG. 9 in some embodiments. For example, some or all of the functionality of the console 910 is provided by the near-eye-display 905.

The near-eye-display 905 presents content to a user. The content can include artificial views of a physical, real-world environment with computer-generated elements (e.g., two-dimensional (2D) or three-dimensional (3D) images, 2D or 3D video, sound, etc.). In some embodiments, the near-eye-display 905 is the NED 100. Examples of content presented by the near-eye-display 905 include one or more images, video, audio, text, or some combination thereof. In some embodiments, audio is presented via an external device (e.g., speakers and/or headphones) that receives audio information from the near-eye-display 905, the console 910, or both, and presents audio data based on the audio information. In some embodiments, the near-eye-display 905 may present artificial reality content to a user. In some embodiments, the near-eye-display 905 may augment views of a physical, real-world environment with computer-generated elements (e.g., images, video, sound, etc.).

The near-eye-display 905 includes the display assembly 260 for each eye, a depth camera assembly (DCA) 920, one or more position sensors 925, and an inertial measurement unit (IMU) 930. Some embodiments of the near-eye-display 905 have different components than those described here. Additionally, the functionality provided by various components described in conjunction with FIG. 9 may be differently distributed among the components of the near-eye-display 905 in other embodiments.

The display assembly 260 is described in further detail with reference to FIG. 2. The display assembly 260 directs the image light to an eye. The display assembly 260 may be composed of one or more materials (e.g., plastic, glass, etc.) with one or more refractive indices that effectively minimize the weight and widen a field of view (hereinafter abbreviated as 'FOV') of the near eye display 905.

The DCA 920 captures data describing depth information of a local area surrounding some or all of the near-eye-display 905. The DCA 920 can compute the depth information using the data (e.g., based on a captured portion of a light pattern), or the DCA 920 can send this information to another device such as the console 910 that can determine the depth information using the data from the DCA 920. The DCA 920 is used to determine depth information about a target area. In some embodiments, the target area is a user's eye, and thus the DCA 920 is used for eye tracking. In some embodiments, the target area is a local area, and thus the DCA 920 is used to capture depth information about an area around a user.

The DCA 920 includes an illumination source, an imaging device and a controller. The illumination source of the DCA 920 is configured to illuminate the target area with illumination light in accordance with emission instructions. The illumination source of the DCA 920 may be any of the illumination generators described in FIGS. 3-8. The imaging device of the DCA 920 includes a lens assembly, a filtering element and a detector. The lens assembly is configured to receive light from a target area surrounding the imaging device and to direct at least a portion of the received light to the detector. The filtering element may be placed in the imaging device within the lens assembly such that light is incident at a surface of the filtering element within a range of angles, wherein the range of angles is determined by a design range of angles at which the filtering element is designed to filter light. The detector is configured to capture one or more images of the target area including the filtered light. In some embodiments, the lens assembly generates collimated light using the received light, the collimated light composed of light rays substantially parallel to an optical axis. The surface of the filtering element is perpendicular to the optical axis, and the collimated light is incident on the surface of the filtering element. The filtering element may be configured to reduce an intensity of a portion of the collimated light to generate the filtered light. The controller of the DCA 920 generates the emission instructions and provides the emission instructions to the light generator. The controller of the DCA 920 further determines depth information for the one or more objects in the target area based in part on the captured one or more images.

In some embodiments, the DCA 920 is used for eye tracking. The DCA 920 determines eye tracking information associated with an eye of a user wearing the near-eye-display 905. The eye tracking information determined by the DCA 920 may comprise information about an orientation of the user's eye, i.e., information about an angle of an eye-gaze.

The IMU 930 is an electronic device that generates data indicating a position of the near-eye-display 905 based on measurement signals received from one or more of the position sensors 925 and from depth information received from the DCA 920. A position sensor 925 generates one or more measurement signals in response to motion of the near-eye-display 905. Examples of position sensors 925 include: one or more accelerometers, one or more gyroscopes, one or more magnetometers, another suitable type of sensor that detects motion, a type of sensor used for error correction of the IMU 930, or some combination thereof. The position sensors 925 may be located external to the IMU 930, internal to the IMU 930, or some combination thereof.

Based on the one or more measurement signals from one or more position sensors 925, the IMU 930 generates data indicating an estimated current position of the near-eye-display 905 relative to an initial position of the near-eye-display 905. For example, the position sensors 925 include multiple accelerometers to measure translational motion (forward/back, up/down, left/right) and multiple gyroscopes to measure rotational motion (e.g., pitch, yaw, roll). In some embodiments, the IMU 930 rapidly samples the measurement signals and calculates the estimated current position of the near-eye-display 905 from the sampled data. For example, the IMU 930 integrates the measurement signals received from the accelerometers over time to estimate a velocity vector and integrates the velocity vector over time to determine an estimated current position of a reference point on the near-eye-display 905. Alternatively, the IMU 930 provides the sampled measurement signals to the console 910, which interprets the data to reduce error. The reference point is a point that may be used to describe the position of the near-eye-display 905. The reference point may generally be defined as a point in space or a position related to the near-eye-display's 905 orientation and position.

The IMU 930 receives one or more parameters from the console 910. The one or more parameters are used to maintain tracking of the near-eye-display 905. Based on a received parameter, the IMU 930 may adjust one or more IMU parameters (e.g., sample rate). In some embodiments, certain parameters cause the IMU 930 to update an initial position of the reference point so it corresponds to a next position of the reference point. Updating the initial position of the reference point as the next calibrated position of the reference point helps reduce accumulated error associated with the current position estimated the IMU 930. The accumulated error, also referred to as drift error, causes the estimated position of the reference point to "drift" away from the actual position of the reference point over time. In some embodiments of the near-eye-display 905, the IMU 930 may be a dedicated hardware component. In other embodiments, the IMU 930 may be a software component implemented in one or more processors.

The I/O interface 915 is a device that allows a user to send action requests and receive responses from the console 910. An action request is a request to perform a particular action. For example, an action request may be an instruction to start or end capture of image or video data or an instruction to perform a particular action within an application. The I/O interface 915 may include one or more input devices. Example input devices include: a keyboard, a mouse, a game controller, or any other suitable device for receiving action requests and communicating the action requests to the console 910. An action request received by the I/O interface 915 is communicated to the console 910, which performs an action corresponding to the action request. In some embodiments, the I/O interface 915 includes an IMU 930 that captures calibration data indicating an estimated position of the I/O interface 915 relative to an initial position of the I/O interface 915. In some embodiments, the I/O interface 915 may provide haptic feedback to the user in accordance with instructions received from the console 910. For example, haptic feedback is provided when an action request is received, or the console 910 communicates instructions to the I/O interface 915 causing the I/O interface 915 to generate haptic feedback when the console 910 performs an action.

The console 910 provides content to the near-eye-display 905 for processing in accordance with information received from one or more of: the DCA 920, the near-eye-display 905, and the I/O interface 915. In the example shown in FIG.

9, the console 910 includes a content engine 935, an application store 940, and a tracking module 945. Some embodiments of the console 910 have different modules or components than those described in conjunction with FIG. 9. Similarly, the functions further described below may be distributed among components of the console 910 in a different manner than described in conjunction with FIG. 9.

The application store 940 stores one or more applications for execution by the console 910. An application is a group of instructions, that when executed by a processor, generates content for presentation to the user. Content generated by an application may be in response to inputs received from the user via movement of the near-eye-display 905 or the I/O interface 915. Examples of applications include: gaming applications, conferencing applications, video playback applications, or other suitable applications.

The tracking module 945 calibrates the near-eye-display system 900 using one or more calibration parameters and may adjust one or more calibration parameters to reduce error in determination of the position of the near-eye-display 905 or of the I/O interface 915. For example, the tracking module 945 communicates a calibration parameter to the DCA 920 to adjust the focus of the DCA 920 to more accurately determine positions of structured light elements captured by the DCA 920. Calibration performed by the tracking module 945 also accounts for information received from the IMU 930 in the near-eye-display 905 and/or an IMU 930 included in the I/O interface 915. Additionally, if tracking of the near-eye-display 905 is lost (e.g., the DCA 920 loses line of sight of at least a threshold number of structured light elements), the tracking module 945 may re-calibrate some or all of the near-eye-display system 900.

The tracking module 945 tracks movements of the near-eye-display 905 or of the I/O interface 915 using information from the DCA 920, the one or more position sensors 925, the IMU 930 or some combination thereof. For example, the tracking module 945 determines a position of a reference point of the near-eye-display 905 in a mapping of a local area based on information from the near-eye-display 905. The tracking module 945 may also determine positions of the reference point of the near-eye-display 905 or a reference point of the I/O interface 915 using data indicating a position of the near-eye-display 905 from the IMU 930 or using data indicating a position of the I/O interface 915 from an IMU 930 included in the I/O interface 915, respectively. Additionally, in some embodiments, the tracking module 945 may use portions of data indicating a position or the near-eye-display 905 from the IMU 930 as well as representations of the local area from the DCA 920 to predict a future location of the near-eye-display 905. The tracking module 945 provides the estimated or predicted future position of the near-eye-display 905 or the I/O interface 915 to the content engine 935.

The content engine 935 generates a 3D mapping of the area surrounding some or all of the near-eye-display 905 (i.e., the "local area") based on information received from the near-eye-display 905. In some embodiments, the content engine 935 determines depth information for the 3D mapping of the local area based on information received from the DCA 920 that is relevant for techniques used in computing depth. The content engine 935 may calculate depth information using one or more techniques in computing depth from structured light. In various embodiments, the content engine 935 uses the depth information to, e.g., update a model of the local area, and generate content based in part on the updated model.

The content engine 935 also executes applications within the near-eye-display system 900 and receives position information, acceleration information, velocity information, predicted future positions, or some combination thereof, of the near-eye-display 905 from the tracking module 945. Based on the received information, the content engine 935 determines content to provide to the near-eye-display 905 for presentation to the user. For example, if the received information indicates that the user has looked to the left, the content engine 935 generates content for the near-eye-display 905 that mirrors the user's movement in a virtual environment or in an environment augmenting the local area with additional content. Additionally, the content engine 935 performs an action within an application executing on the console 910 in response to an action request received from the I/O interface 915 and provides feedback to the user that the action was performed. The provided feedback may be visual or audible feedback via the near-eye-display 905 or haptic feedback via the I/O interface 915.

In some embodiments, based on the eye tracking information (e.g., orientation of the user's eye) received from the DCA 920, the content engine 935 determines resolution of the content provided to the near-eye-display 905 for presentation to the user on an electronic display. The content engine 935 provides the content to the near-eye-display 905 having a maximum pixel resolution on the electronic display in a foveal region of the user's gaze, whereas the content engine 935 provides a lower pixel resolution in other regions of the electronic display, thus achieving less power consumption at the near-eye-display 905 and saving computing cycles of the console 910 without compromising a visual experience of the user. In some embodiments, the content engine 935 can further use the eye tracking information to adjust where objects are displayed to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An illumination source comprising:
    a first waveguide optically coupled to a first light source;
    a second waveguide that is configured to receive light from the first waveguide;
    a third waveguide that is configured to receive the light from the first waveguide; and
    a first active phase delay element configured to apply a first phase delay to light propagating in the third waveguide such that there is a difference in phase between light exiting the second waveguide and light exiting the third waveguide, and the light exiting the second waveguide and the light exiting the third waveguide combine to form a first interference fringe pattern that illuminates a portion of a target area that is an eye box of a near eye device (NED),
    wherein the illumination source is located on the NED and is part of a depth camera assembly (DCA) that is configured to:
        capture images of a portion of the eye box that includes at least some of the first interference fringe pattern, and
        determine depth information for an eye in the eye box based in part on the captured images.

2. The illumination source of claim 1, wherein the first waveguide, the second waveguide and the third waveguide are monolithic.

3. The illumination source of claim 1, wherein the first waveguide and the second waveguide are on a first substrate, the illumination source further comprising:
    a fourth waveguide located on the substrate and optically coupled to a second light source on the first substrate;
    a fifth waveguide that is configured to receive light from the fourth waveguide;
    a sixth waveguide that is configured to receive the light from the fourth waveguide; and
    a second active phase delay element configured to apply a phase delay to light propagating in the sixth waveguide such that there is a difference in phase between light exiting the fifth waveguide and light exiting the sixth waveguide, and the light exiting the fifth waveguide and the light exiting the sixth waveguide combine to form a second interference fringe pattern that illuminates a portion of the target area, and the second interference fringe pattern is based in part on the phase delay, and is different from the first interference fringe pattern.

4. The illumination source of claim 3, wherein the fifth waveguide and the sixth waveguide are located on the first substrate between the second waveguide and the third waveguide, and the first interference fringe pattern and the second interference fringe pattern exit the illumination source in a same direction.

5. The illumination source of claim 3, wherein:
    the first interference fringe pattern is based in part on a first distance between an exit of the second waveguide and an exit of the third waveguide; and
    the second interference fringe pattern is based in part on a second distance between an exit of the fifth waveguide and an exit of the sixth waveguide, and wherein the first distance is larger than the second distance.

6. The illumination source of claim 1, wherein the first waveguide and the second waveguide are on a first substrate, the illumination source further comprising:
    a fourth waveguide located on a second substrate and optically coupled to a second light source on the second substrate;
    a fifth waveguide that is configured to receive light from the fourth waveguide;
    a sixth waveguide that is configured to receive the light from the fourth waveguide;
    a second active phase delay element configured to apply a phase delay to light propagating in the sixth waveguide such that there is a difference in phase between light exiting the fifth waveguide and light exiting the sixth waveguide, and the light exiting the fifth waveguide and the light exiting the sixth waveguide combine to form a second interference fringe pattern that illuminates a portion of the target area, and the second interference fringe pattern is based in part on the phase delay; and
    a third substrate, wherein the first substrate and the second substrate are bonded to opposite major sides of the third substrate.

7. The illumination source of claim 6, wherein the first interference fringe pattern and the second interference fringe pattern exit the illumination source in a same direction.

8. The illumination source of claim 1, wherein the first waveguide and the second waveguide are on a first substrate, the illumination source further comprising:
    an optical circulator configured to receive light from the first light source and a second light source that is located on the first substrate, and wherein the first waveguide is optically coupled to the first light source via the optical circulator;
    a fourth waveguide optically coupled to a fifth waveguide and a sixth waveguide via the optical circulator; and
    a second active phase delay element configured to apply a phase delay to light propagating in the sixth waveguide such that there is a difference in phase between light exiting the fifth waveguide and light exiting the sixth waveguide, and the light exiting the fifth waveguide and the light exiting the sixth waveguide combine to form a second interference fringe pattern that illuminates a portion of the target area, and the second interference fringe pattern is based in part on the phase delay, and is different from the first interference fringe pattern.

9. The illumination source of claim 8, wherein the first interference fringe pattern and the second interference fringe pattern exit the illumination source in a same direction.

10. The illumination source of claim 8, wherein a first junction between the first waveguide, the second waveguide and the third waveguide is curved, and a second junction between the fourth waveguide, the fifth waveguide and the sixth waveguide is curved.

11. The illumination source of claim 1, wherein the first waveguide and the second waveguide are on a first substrate, the illumination source further comprising:
a fourth waveguide optically coupled to a second light source on the first substrate; and
a coupling controller configured to optically couple the second waveguide and the third waveguide to the second light source according to a coupling ratio, and wherein the fourth waveguide is contiguous with the third waveguide and conveys light from the second light source to the second waveguide.

12. The illumination source of claim 11, further comprising:
a second active phase delay located on the second waveguide and configured to apply a second phase delay to light propagating in the second waveguide; and
wherein the first interference fringe pattern is based in part on the first phase delay, the second phase delay, and the coupling ratio.

13. The illumination source of claim 11, wherein the coupling ratio is adjustable, and the first light source and the second light source are at least one of: time multiplexed, different wavelengths, and different polarizations.

14. A method comprising:
receiving, at a first waveguide on a substrate that is part of an illuminator of a depth camera assembly (DCA) that is part of a near-eye device (NED), light from a first light source;
receiving, at a second waveguide on the substrate, a first portion of the light from the first waveguide;
receiving, at a third waveguide on the substrate, a second portion of the light from the first waveguide;
applying a first phase delay to the second portion of the light propagating in the third waveguide such that there is a difference in phase between light exiting the second waveguide and light exiting the third waveguide, and the light exiting the second waveguide and the light exiting the third waveguide combine to form a first interference fringe pattern that illuminates a portion of a target area that is an eye box of a near eye device (NED),
capturing, via the DCA, images of a portion of the eye box that includes at least some of the first interference fringe pattern; and
determining depth information for an eye in the eye box based in part on the captured images.

15. The method of claim 14, further comprising:
optically coupling the second waveguide and the third waveguide to a second light source according to a coupling ratio.

16. An illumination source comprising:
a first waveguide optically coupled to a first light source;
a first output grating located on the first waveguide at a first distance from the first light source;
a second output grating located on the first waveguide at a second distance from the light source, and wherein the second distance is greater than the first distance; and
a first active phase delay element located between the first output grating and the second output grating and configured to apply a first phase delay to light propagating in the first waveguide after the first output grating such that there is a difference in phase between light exiting the first output grating and light exiting the second output grating, and the light exiting the first output grating and the second output grating combine to form a first interference fringe pattern that illuminates a portion of the target area that is an eye box of a near eye device (NED), wherein the illumination source is located on the NED and is part of a depth camera assembly (DCA) that is configured to:
capture images of a portion of the eye box that includes at least some of the first interference fringe pattern, and
determine depth information for an eye in the eye box based in part on the captured images.

17. The illumination source of claim 16, wherein the first waveguide is on a first substrate, the illumination source further comprising:
a second waveguide located on the first substrate and optically coupled to a second light source on the first substrate;
a third output grating located on the second waveguide and aligned with the first output grating;
a fourth output grating located on the second waveguide and aligned with the second output grating; and
a second active phase delay element located between the third output grating and the fourth output grating and configured to apply a second phase delay to light propagating in the second waveguide after the third output grating such that there is a difference in phase between light exiting the third output grating and light exiting the fourth output grating, and the light exiting the first output grating, the second output grating, the third output grating and the fourth output grating combine to form the first interference fringe pattern that illuminates a portion of the target area, and the first interference fringe pattern is based in part on the first phase delay and the second phase delay.

* * * * *